(12) United States Patent
Forstall et al.

(10) Patent No.: US 7,934,156 B2
(45) Date of Patent: Apr. 26, 2011

(54) DELETION GESTURES ON A PORTABLE MULTIFUNCTION DEVICE

(75) Inventors: Scott Forstall, Mountain View, CA (US); Greg Christie, San Jose, CA (US); Stephen O. Lemay, San Francisco, CA (US); Bas Ording, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 900 days.

(21) Appl. No.: 11/850,642

(22) Filed: Sep. 5, 2007

(65) Prior Publication Data

US 2008/0094371 A1    Apr. 24, 2008

Related U.S. Application Data

(60) Provisional application No. 60/937,993, filed on Jun. 29, 2007, provisional application No. 60/936,755, filed on Jun. 22, 2007, provisional application No. 60/883,814, filed on Jan. 7, 2007, provisional application No. 60/879,469, filed on Jan. 8, 2007, provisional application No. 60/879,253, filed on Jan. 7, 2007, provisional application No. 60/824,769, filed on Sep. 6, 2006.

(51) Int. Cl.
*G06F 17/00* (2006.01)
*G06F 3/033* (2006.01)

(52) U.S. Cl. ........ 715/255; 715/273; 715/840; 715/810; 715/863; 345/173; 345/169

(58) Field of Classification Search .................. 715/255, 715/273, 840, 810, 863; 345/173, 169; 455/466
See application file for complete search history.

(56) References Cited

U.S. PATENT DOCUMENTS

| 5,867,150 A | 2/1999 | Bricklin et al. ............... 345/173 |
| 6,094,197 A | 7/2000 | Buxton et al. ................ 345/358 |
| 2004/0140956 A1* | 7/2004 | Kushler et al. ................ 345/168 |

(Continued)

FOREIGN PATENT DOCUMENTS

WO    WO 01/75568 A1    10/2001

OTHER PUBLICATIONS

International Search Report of International Searching Authority, PCT/US2007/077776, Dec. 28, 2007.

(Continued)

*Primary Examiner* — Tadeese Hailu
(74) *Attorney, Agent, or Firm* — Morgan, Lewis & Bockius LLP

(57) ABSTRACT

Deletion gestures for use on a portable multifunction device with a touch-sensitive display are disclosed. In some embodiments, a computer-implemented method for use in conjunction with the portable multifunction device comprises displaying a list of items on the touch-sensitive display, detecting a first gesture on the touch-sensitive display to edit the list of items, responding to the first gesture by displaying a first icon next to each deletable item in the list, detecting a second gesture on the touch-sensitive display to select one of the deletable items, and responding to the second gesture by displaying a second icon next to the selected item. If a third gesture on the second icon is detected, the selected deletable item is deleted. If a fourth gesture on the first icon next to the selected deletable item is detected, the second icon is deleted.

49 Claims, 26 Drawing Sheets

U.S. PATENT DOCUMENTS

| | | | |
|---|---|---|---|
| 2005/0134578 A1* | 6/2005 | Chambers et al. | 345/184 |
| 2006/0053387 A1 | 3/2006 | Ording | 715/773 |
| 2006/0080386 A1* | 4/2006 | Roykkee et al. | 709/203 |
| 2006/0101354 A1* | 5/2006 | Hashimoto et al. | 715/863 |
| 2007/0036346 A1* | 2/2007 | Kwon | 379/413 |
| 2007/0157094 A1* | 7/2007 | Lemay et al. | 715/717 |

OTHER PUBLICATIONS

Flow State, "Some Basic UI Patterns for Preventing Accidental Deletion," http://miksovsky.blog.com/flowstate/2006/02/some_basic_ui p.html, Oct. 16, 2006, 3 pages.

* cited by examiner

DELETION GESTURES ON A PORTABLE MULTIFUNCTION DEVICE

RELATED APPLICATIONS

This application claims priority to U.S. Provisional Patent Application Nos. 60/937,993, "Portable Multifunction Device," filed Jun. 29, 2007; 60/936,755, "Deletion Gestures on a Portable Multifunction Device," filed Jun. 22, 2007; 60/883,814, "Deletion Gestures on a Portable Multifunction Device," filed Jan. 7, 2007; 60/879,469, "Portable Multifunction Device," filed Jan. 8, 2007; 60/879,253, "Portable Multifunction Device," filed Jan. 7, 2007; and 60/824,769, "Portable Multifunction Device," filed Sep. 6, 2006. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to deletion gestures on portable electronic devices with touch screen displays, and more particularly, to processes for deleting listed items that involve multiple gestures by a user on different parts of the touch screen.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, many conventional user interfaces lack an intuitive and reliable method of deleting listed items such as instant messages, email addresses, or phone numbers. Inflexible user interfaces create a risk that a user will accidentally delete an item.

Accordingly, there is a need for portable multifunction devices with more transparent and intuitive user interfaces for deleting listed items that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments, a computer-implemented method for deleting items listed on a touch screen display of a portable electronic device is disclosed. A list of items is displayed on the touch screen display. A first gesture on the touch screen display to edit the list of items is detected. In response to the first gesture a first icon is displayed next to each deletable item in the list. A second gesture on the touch screen display to select one of the deletable items is detected. In response to the second gesture a second icon is displayed next to the selected deletable item. If a third gesture on the second icon is detected the selected deletable item is deleted. If a fourth gesture on the first icon next to the selected deletable item is detected the second icon is deleted.

In accordance with some embodiments, a graphical user interface on a portable electronic device with a touch screen display is disclosed. The graphical user interface comprises a list of items, one or more first icons next to deletable items in the list, and a second icon next to a selected deletable item in the list. The second icon is different from the first icon. The one or more first icons are displayed in response to the detection of a first gesture on the touch screen display to edit the list of items. The second icon is displayed next to the selected deletable item in the list in response to the detection of a second gesture on the touch screen display to select one of the deletable items. The selected deletable item is deleted if a third gesture on the second icon is detected. The second icon is deleted if a fourth gesture on the first icon next to the selected deletable item is detected. The one or more first icons next to deletable items in the list cease to be displayed if a fifth gesture on the touch screen display is detected.

In accordance with some embodiments, a portable electronic device is disclosed, comprising a touch screen display, one or more processors, memory, and one or more programs. The one or more programs are stored in the memory and configured to be executed by the one or more processors. The one or more programs include instructions for displaying a list of items, instructions for detecting a first gesture on the touch screen display to edit the list of items, and instructions for responding to the first gesture by displaying a first icon next to each deletable item in the list. The one or more programs further include instructions for detecting a second gesture on the touch screen display to select one of the deletable items and instructions for responding to the second gesture by displaying a second icon next to the selected deletable item. The one or more programs further include instructions for deleting the selected deletable item if a third gesture on the second icon is detected and instructions for deleting the second icon if a fourth gesture on the first icon next to the selected deletable item is detected.

In accordance with some embodiments, a computer-program product is disclosed, comprising a computer readable storage medium and a computer program mechanism (e.g., one or more computer programs) embedded therein. The computer program mechanism comprises instructions, which when executed by a portable electronic device with a touch screen display, cause the device to display a list of items, detect a first gesture on the touch screen display to edit the list of items, and respond to the first gesture by displaying a first icon next to each deletable item in the list. The instructions further cause the device to detect a second gesture on the touch screen display to select one of the deletable items and to respond to the second gesture by displaying a second icon next to the selected deletable item. The instructions further cause the device to delete the selected deletable item if a third gesture on the second icon is detected and to delete the second icon if a fourth gesture on the first icon next to the selected deletable item is detected.

In accordance with some embodiments, a portable electronic device with a touch screen display is disclosed. The device comprises means for displaying a list of items, means for detecting a first gesture on the touch screen display to edit the list of items, and means for responding to the first gesture by displaying a first icon next to each deletable item in the list. The device further comprises means for detecting a second gesture on the touch screen display to select one of the deletable items and means for responding to the second gesture by displaying a second icon next to the selected deletable item. The device further comprises means for deleting the selected deletable item if a third gesture on the second icon is detected and means for deleting the second icon if a fourth gesture on the first icon next to the selected deletable item is detected.

In accordance with some embodiments, a computer-implemented method for deleting an item listed on a touch screen display of a portable electronic device is disclosed. The method includes displaying a list of items, detecting a first gesture on the touch screen display to select for deletion an item in the list of items, displaying an icon next to the selected item, and deleting the selected item if a second gesture on the icon is detected.

In accordance with some embodiments, a computer-implemented method for deleting an item listed on a touch screen display of a portable electronic device is disclosed. The method includes displaying a list of items, detecting a first gesture on the touch screen display to select for deletion an item in the list of items, displaying an icon next to the selected item, and deleting the selected item if a second gesture on the touch screen display is detected.

In accordance with some embodiments, a portable electronic device is disclosed, comprising a touch screen display, one or more processors, memory, and one or more programs. The one or more programs are stored in the memory and configured to be executed by the one or more processors. The one or more programs include instructions for displaying a list of items, instructions for detecting a first gesture on the touch screen display to select for deletion an item in the list of items, instructions for displaying an icon next to the selected item, and instructions for deleting the selected item if a second gesture on the icon is detected.

In accordance with some embodiments, a computer-program product is disclosed, comprising a computer readable storage medium and a computer program mechanism embedded therein. The computer program mechanism comprises instructions, which when executed by a portable electronic device with a touch screen display, cause the device to display a list of items, detect a first gesture on the touch screen display to select for deletion an item in the list of items, display an icon next to the selected item, and delete the selected item if a second gesture on the icon is detected.

In accordance with some embodiments, a portable electronic device with a touch screen display is disclosed. The device comprises means for displaying a list of items, means for detecting a first gesture on the touch screen display to select for deletion an item in the list of items, means for displaying an icon next to the selected item, and means for deleting the selected item if a second gesture on the icon is detected.

In accordance with the disclosed embodiments, a deletion process requiring the user to make multiple gestures on different parts of the touch screen provides an intuitive deletion method that greatly reduces the chance that a user will accidentally delete an item.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
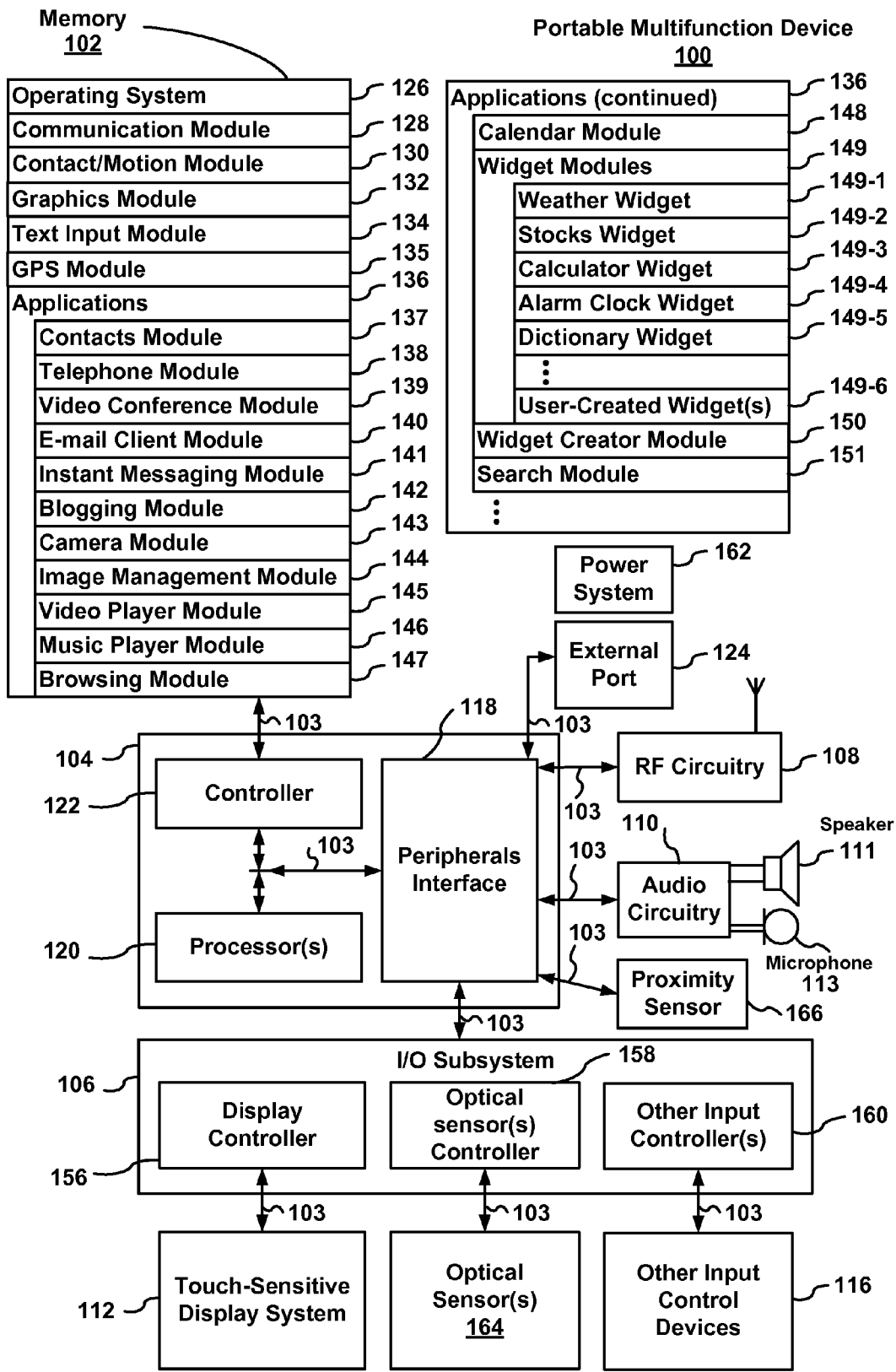
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable electronic device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable electronic device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

The touch screen 112 may have a resolution in excess of 100 dpi. In an exemplary embodiment, the touch screen in the display system has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005, and 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a pre-defined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6; and/or
- search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
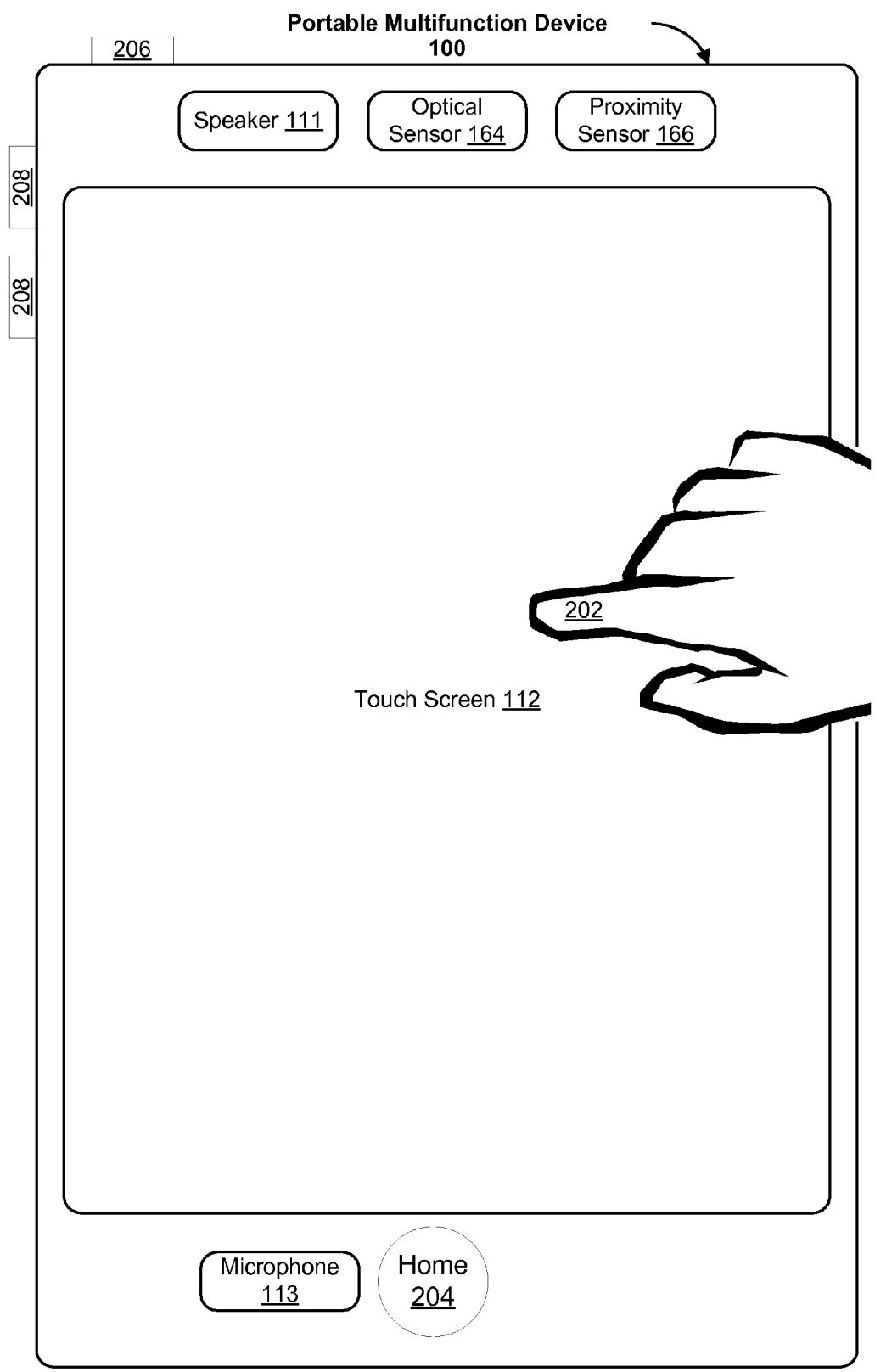
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (e.g., from left to right, or right to left, or back-and-forth in both directions; upward, or downward, or upward and downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
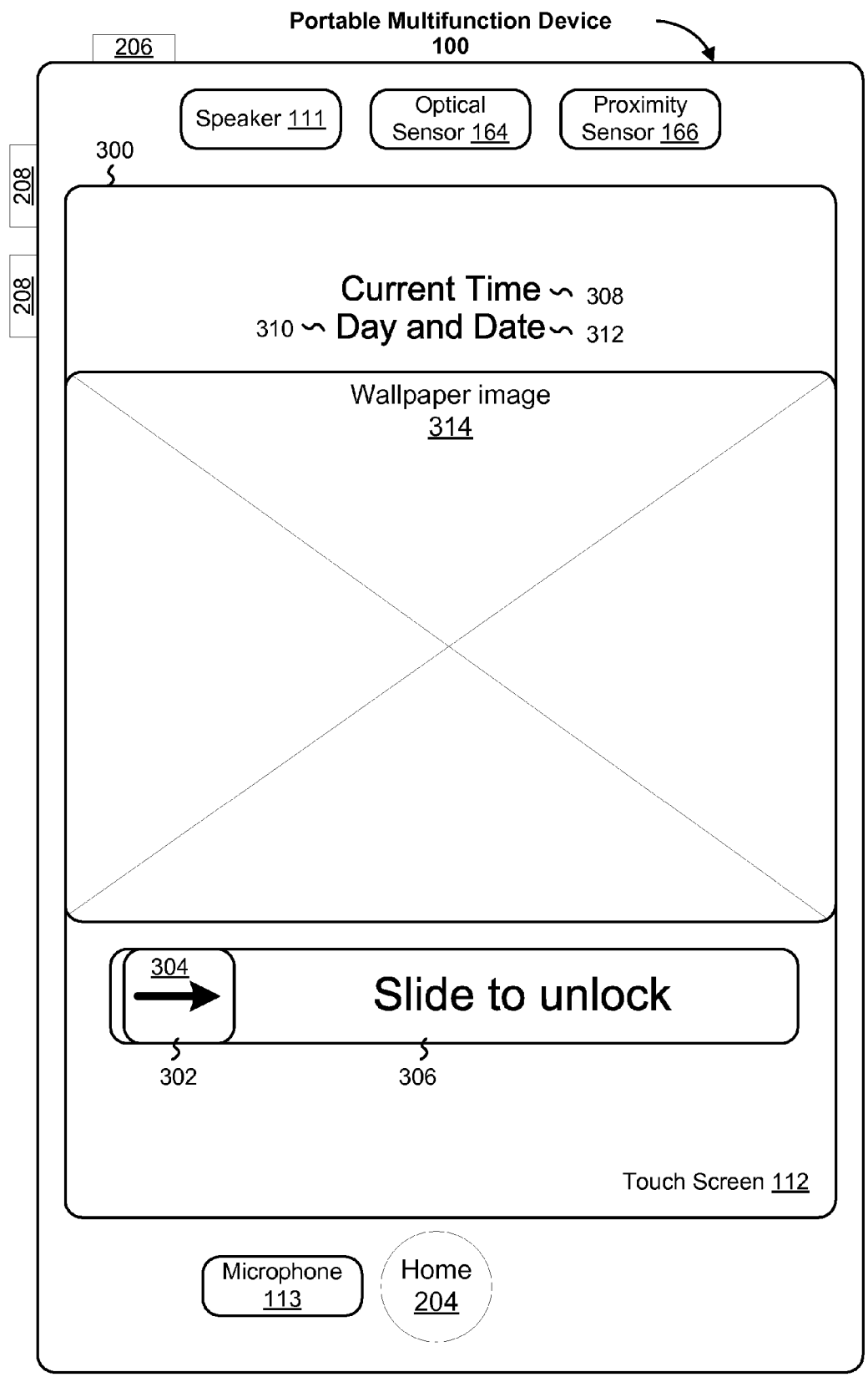
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
  Unlock image 302 that is moved with a finger gesture to unlock the device;
  Arrow 304 that provides a visual cue to the unlock gesture;
  Channel 306 that provides additional cues to the unlock gesture;
  Time 308;
  Day 310;
  Date 312; and
  Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
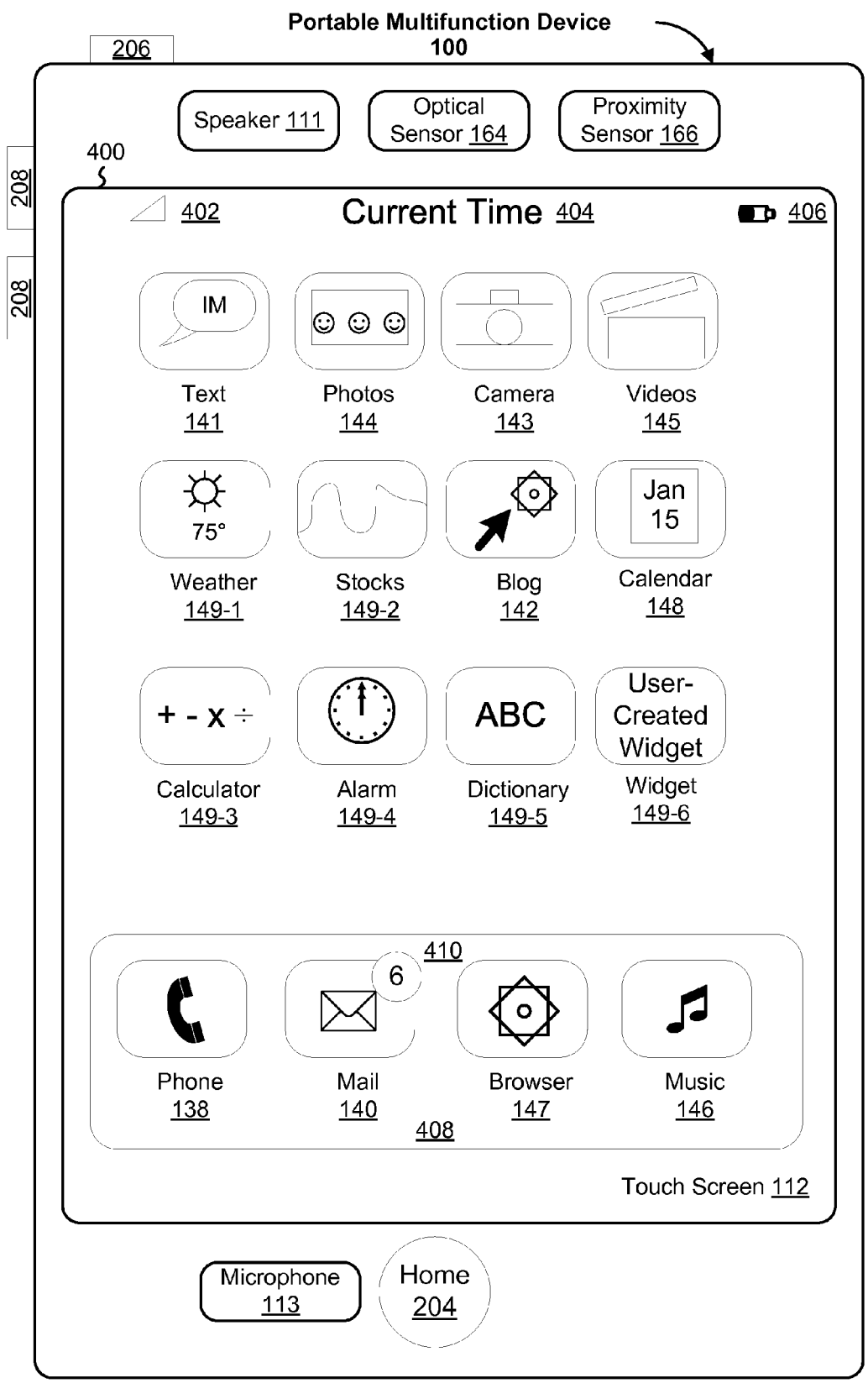
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:
  Signal strength indicator 402 for wireless communication;
  Time 404;
  Battery status indicator 406;
  Tray 408 with icons for frequently used applications, such as:
    Phone 138;
    E-mail client 140, which may include an indicator 410 of the number of unread e-mails;
    Browser 147; and
    Music player 146; and
  Icons for other applications, such as:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device with Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

Figure 5:
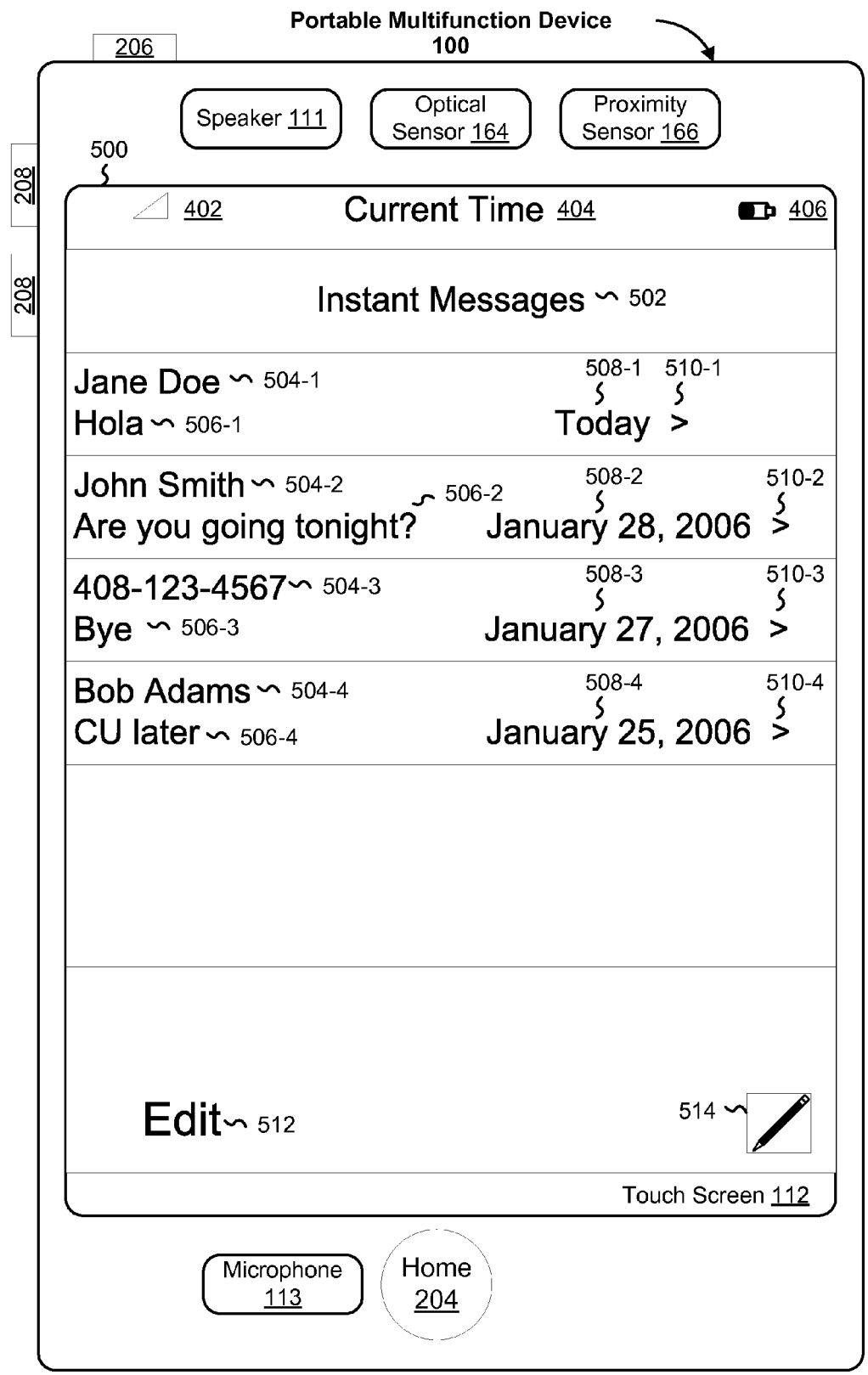
FIG. 5 illustrates an exemplary user interface for listing instant message conversations on a portable multifunction device in accordance with some embodiments.

FIG. 5 illustrates an exemplary user interface for listing instant message conversations on a portable multifunction device in accordance with some embodiments. In some embodiments, user interface 500 includes the following elements, or a subset or superset thereof:
  402, 404, and 406, as described above;
  "Instant Messages" or other similar label 502:
  Names 504 of the people a user is having instant message conversations with (e.g., Jane Doe 504-1) or the phone number if the person's name is not available (e.g., 408-123-4567 504-3);
  Text 506 of the last message in the conversation;
  Date 508 and/or time of the last message in the conversation;
  Selection icon 510 that when activated (e.g., by a finger tap on the icon) initiates transition to a UI for the corresponding conversation (not shown);
  Edit icon 512 that when activated (e.g., by a finger tap on the icon) initiates transition to a UI for deleting conversations (e.g., FIG. 6); and Create message icon 514 that when activated (e.g., by a finger tap on the icon) initiates transition to the user's contact list (e.g., FIG. 8A).

In some embodiments, the name 504 used for an instant message conversation is determined by finding an entry in the user's contact list 137 that contains the phone number used for the instant message conversation. If no such entry is found, then just the phone number is displayed (e.g., 504-3). In some embodiments, if the other party sends messages from two or more different phone numbers, the messages may appear as a single conversation under a single name if all of the phone numbers used are found in the same entry (i.e., the entry for the other party) in the user's contact list 137.

Automatically grouping the instant messages into "conversations" (instant message exchanges with the same user or the same phone number) makes it easier for the user to carry on and keep track of instant message exchanges with multiple parties.

Figure 6:
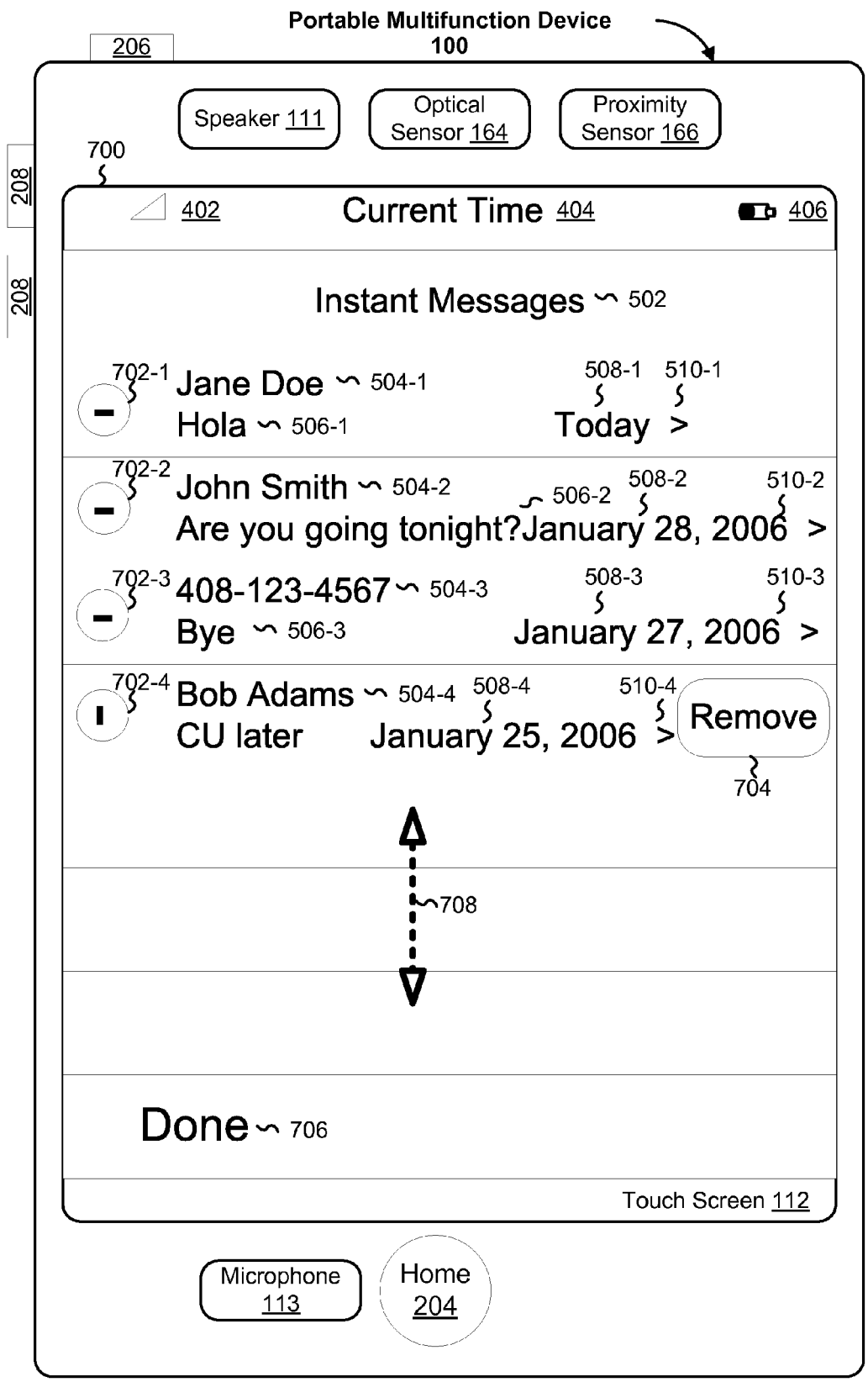
FIG. 6 illustrates an exemplary user interface for deleting an instant message conversation in accordance with some embodiments.

FIG. 6 illustrates an exemplary user interface for deleting an instant message conversation in accordance with some embodiments. In some embodiments, user interface 700 includes the following elements, or a subset or superset thereof:
  402, 404, 406, 504, 506, 508, 510, as described above;
  Delete icons 702;
  Remove icon 704; and
  Done icon 706.

In some embodiments, if the user activates edit icon 512 (FIG. 5), the delete icons 702 appear next to each instant message conversation. If a user activates a delete icon (e.g., by tapping it with a finger), the icon may rotate 90 degrees (e.g., 702-4) or otherwise change its appearance and/or a second icon may appear (e.g., remove icon 704). If the user activates the second icon, the corresponding instant message conversation is deleted. If, however, the user deactivates the activated delete icon (e.g., 702-4) (e.g., by tapping it a second time with a finger), the delete icon may rotate back 90 degrees or otherwise restore its original appearance and the second icon is deleted (e.g., remove icon 704 is no longer displayed). This process is described in more detail below with respect to FIGS. 9A and 9B.

This deletion process, which requires multiple gestures by the user on different parts of the touch screen (e.g., delete icon 702-4 and remove icon 704 are on opposite sides of the touch screen) greatly reduces the chance that a user will accidentally delete a conversation or other similar item.

The user activates the done icon 706 (e.g., by tapping on it with a finger) when the user has finished deleting IM conversations and the device returns to UI 500.

If there is a long list of conversations (not shown) that fill more than the screen area, the user may scroll through the list using vertically upward and/or vertically downward gestures 708 on the touch screen.

FIGS. 7A-7M illustrate an exemplary user interface for displaying and managing contacts in accordance with some embodiments.

Figure 7A:
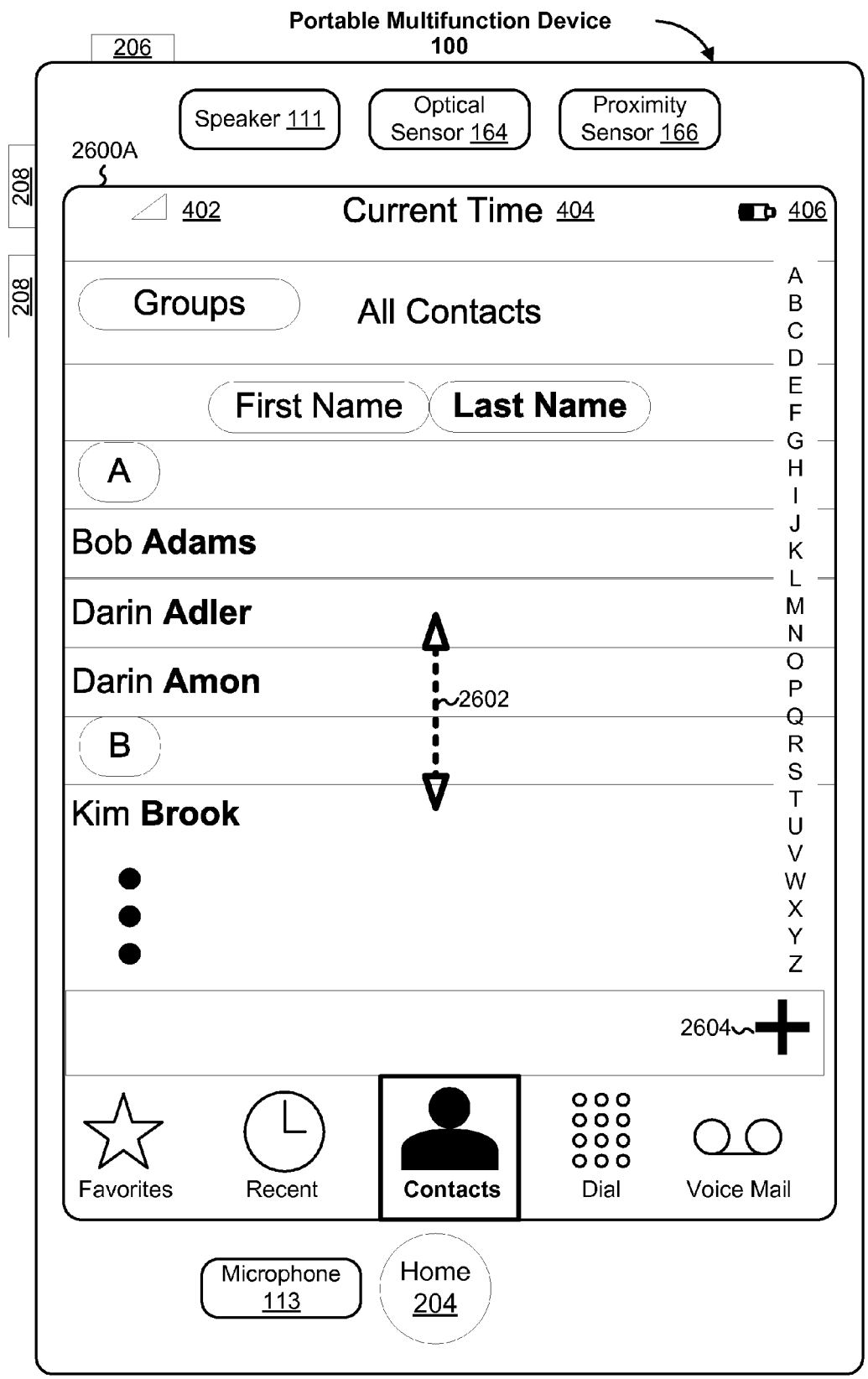
FIGS. 7A-7M illustrate an exemplary user interface for displaying and managing contacts in accordance with some embodiments.

In some embodiments, in response to the user activating phone icon 138 in UI 400 (FIG. 4) (e.g., by a finger tap on the icon), the user's contact list is displayed (e.g., UI 2600A, FIG. 7A).

As described in U.S. patent application Ser. No. 11/322,547, "Scrolling List With Floating Adjacent Index Symbols," filed Dec. 23, 2005, which is hereby incorporated by reference, the user may scroll through the contact list using vertically upward and/or vertically downward gestures 2602 (FIG. 7A) on the touch screen.

Figure 7B:
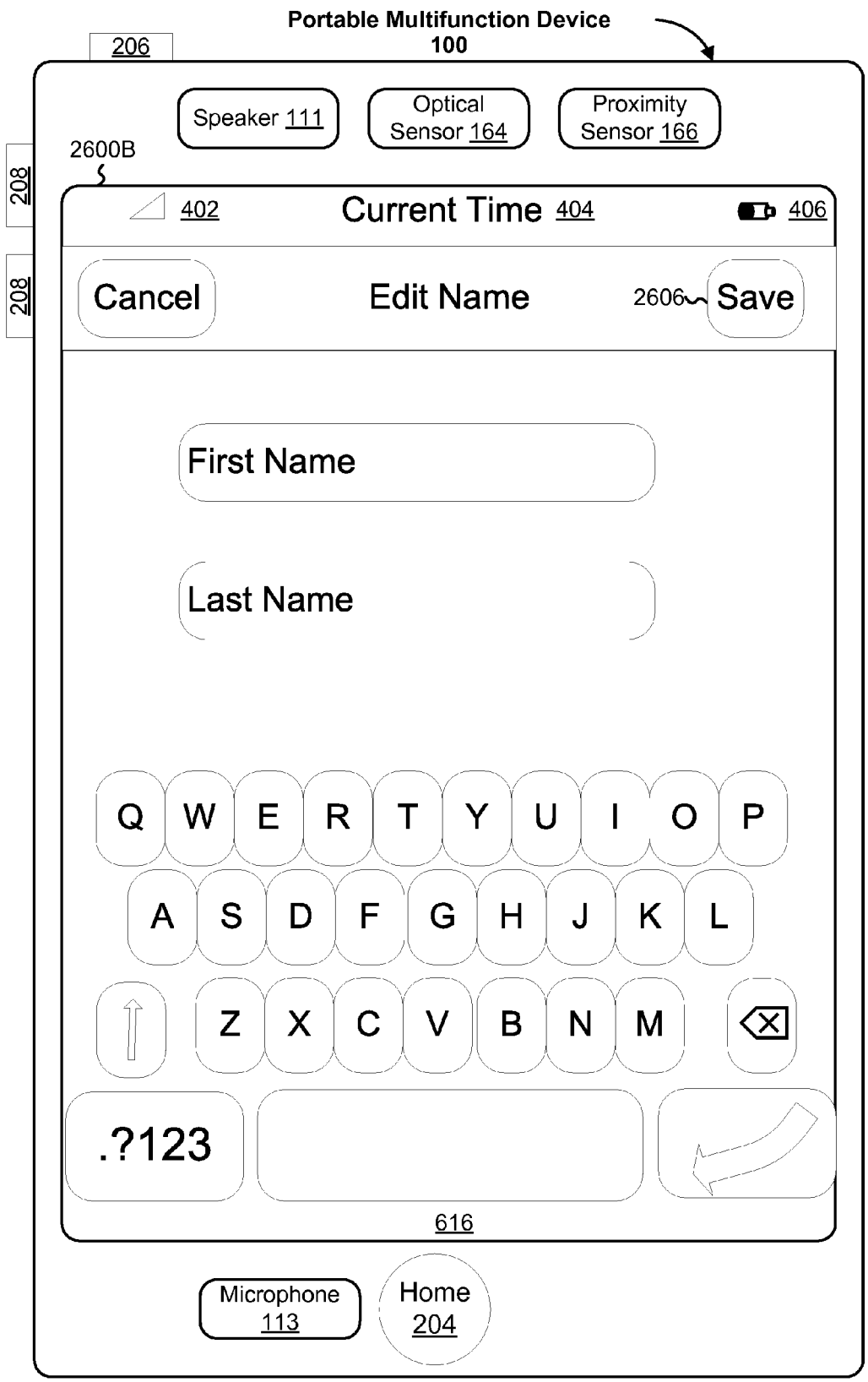
Figure 7C:
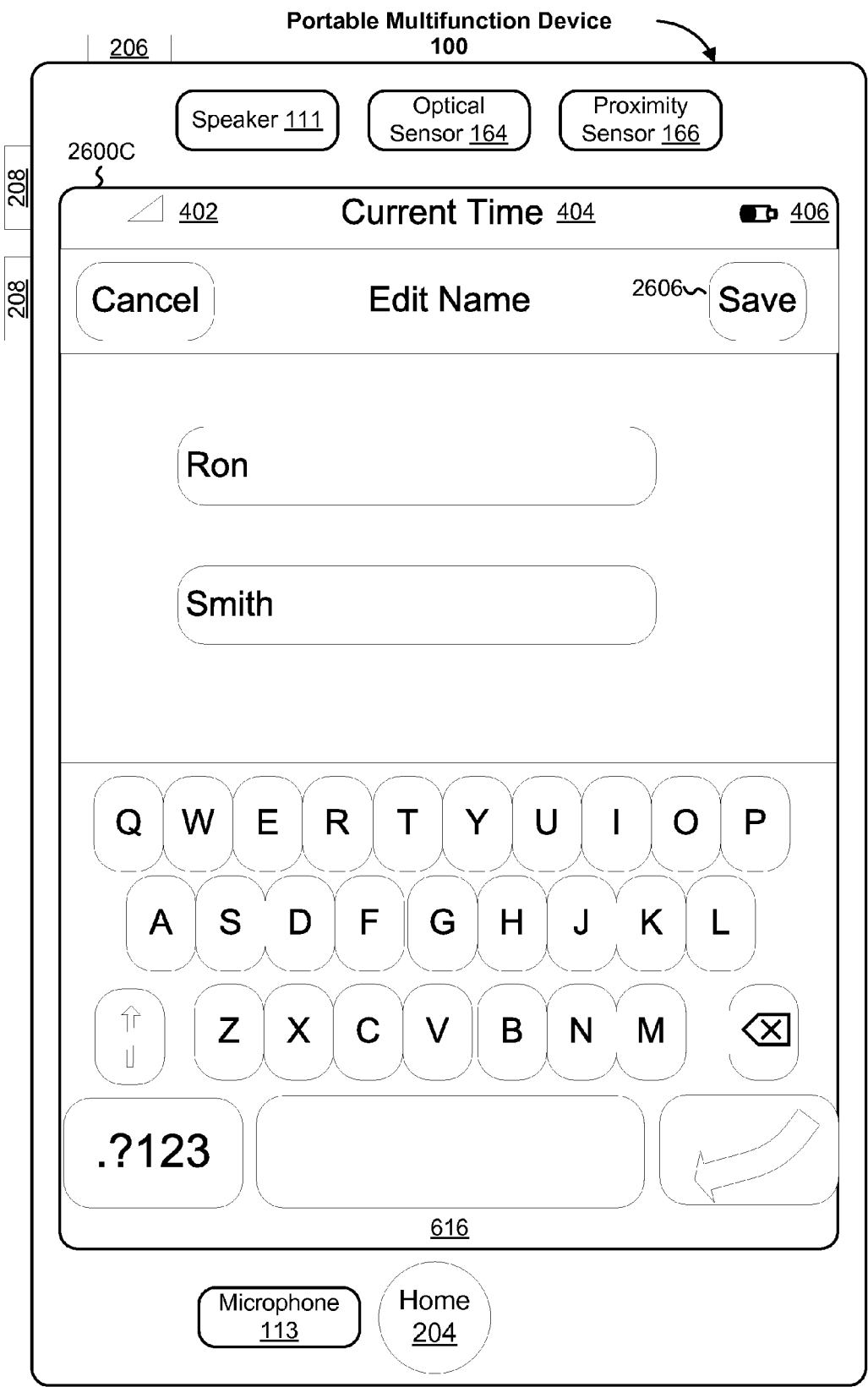

In some embodiments, in response to the user activating add new contact icon 2604 (e.g., by a finger tap on the icon), the touch screen displays a user interface for editing the name of the contact (e.g., UI 2600B, FIG. 7B).

Figure 7D:
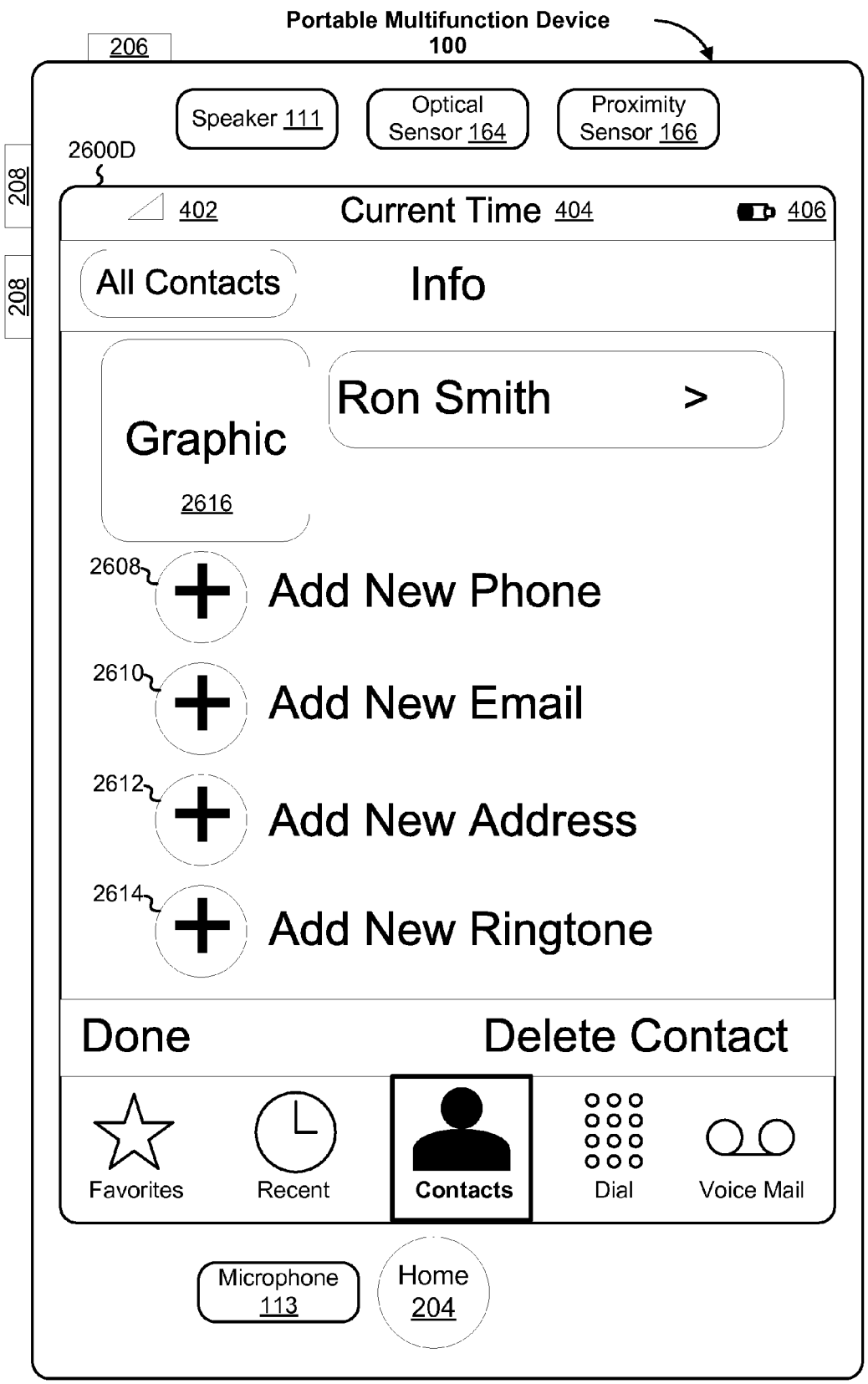

In some embodiments, in response to the user entering the contact name (e.g., entering "Ron Smith" via keyboard 616 in UI 2600C, FIG. 7C) and activating the save icon 2606 (e.g., by a finger tap on the icon), the contacts module creates and displays a new entry for the contact (e.g., UI 2600D, FIG. 7D).

Figure 7E:
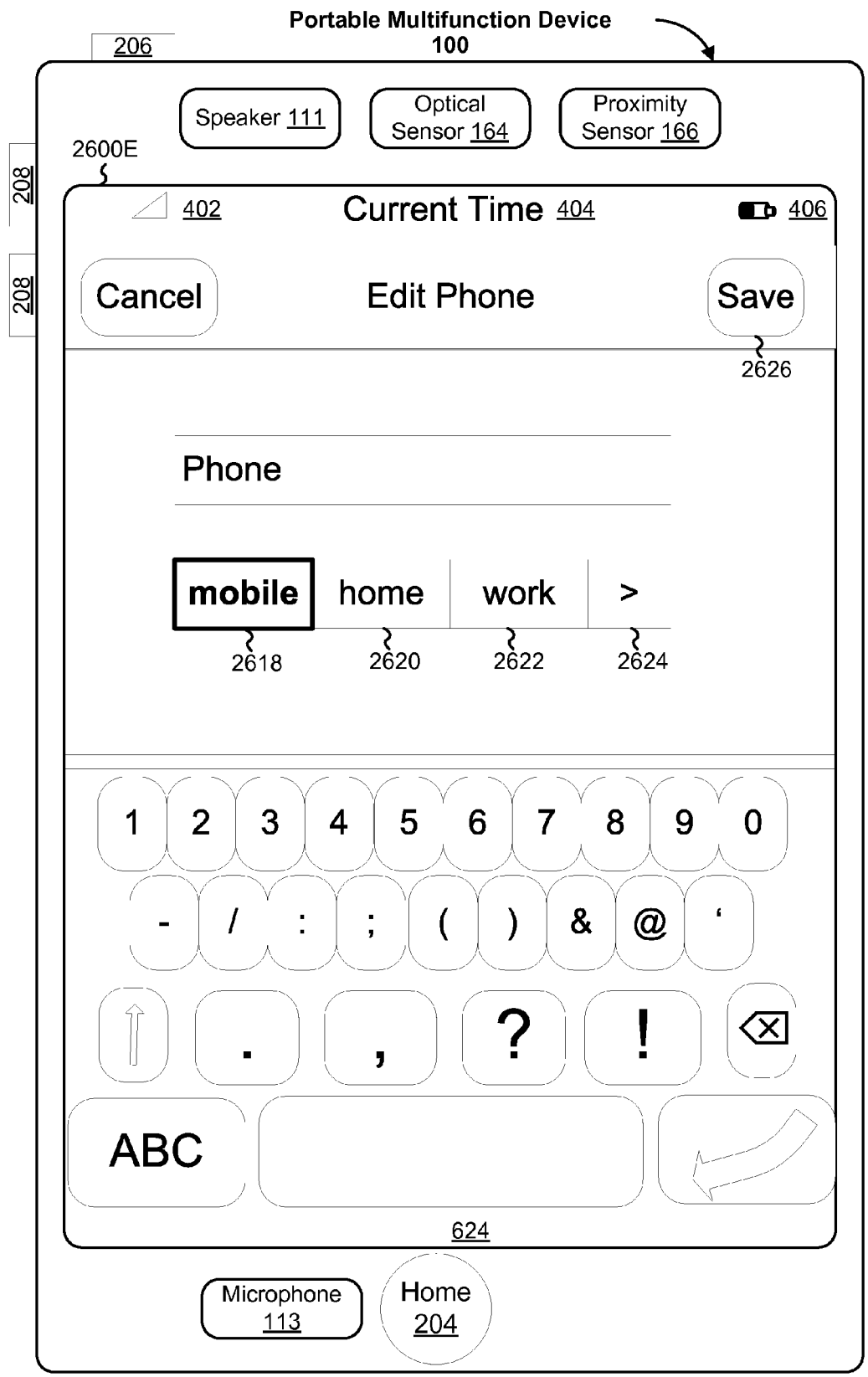

In some embodiments, in response to the user activating add new phone icon 2608 (e.g., by a finger tap on the icon or on the row containing the icon), the touch screen displays a user interface for editing the phone number(s) of the contact (e.g., UI 2600E, FIG. 7E).

In some embodiments, in response to the user entering the phone number (e.g., via keyboard 624 in UI 2600E, FIG. 7E); specifying the type of phone number (e.g., by a tap or other predefined gesture on mobile icon 2618, home icon 2620, or work icon 2622); and activating the save icon 2626 (e.g., by a finger tap on the icon), the contacts module creates a phone number for the corresponding contact.

In some embodiments, the user can select additional phone number types. For example, in response to the user activating selection icon 2624 (e.g., by a finger tap on the icon), the touch screen displays a phone label UI (e.g., UI 2600F, FIG. 7F). In some embodiments, in response to the user activating a label in UI 2600F, the chosen label is displayed in place of work icon 2622 in UI 2600E. In some embodiments, the chosen label is also highlighted in UI 2600E to indicate to the user that the phone number being entered will be given the chosen label.

In some embodiments, the user can add custom phone labels to UI 2600F by activating the add labels icon 2628 and entering the label via a soft keyboard (e.g., 616, not shown).

In some embodiments, the user can delete one or more of the labels in UI 2600F. In some embodiments, only the user's custom labels may be deleted. For example, in response to the user activating the edit icon 2630 (e.g., by a finger tap on the icon), the touch screen displays a delete icon 2632 next to the labels that may be deleted (e.g., UI 2600G, FIG. 7G). If a user activates a delete icon (e.g., by tapping it with a finger), the icon may rotate 90 degrees (e.g., 2634, FIG. 7H) or otherwise change its appearance and/or a second icon may appear (e.g., remove icon 2636, FIG. 7H). If the user activates the second icon, the contact module deletes the corresponding label. If, however, the user deactivates the activated delete icon (e.g., 2634) (e.g., by tapping it a second time with a finger), the delete icon may rotate back 90 degrees or otherwise restore its original appearance and the second icon is deleted (e.g., remove icon 2636 is no longer displayed). This deletion process is analogous to the process described above with respect to FIG. 6 and is described in more detail below with respect to FIGS. 9A and 9B. As noted above, a deletion process that requires multiple gestures by the user on different parts of the touch screen (e.g., delete icon 2632 and remove icon 2636 are on opposite sides of the touch screen in UI 2600H) greatly reduces the chance that a user will accidentally delete a label or other similar item. The user activates the done icon 2638 (e.g., by tapping on it with a finger) when the user has finished deleting labels and the device returns to UI 2600F.

Figure 7F:
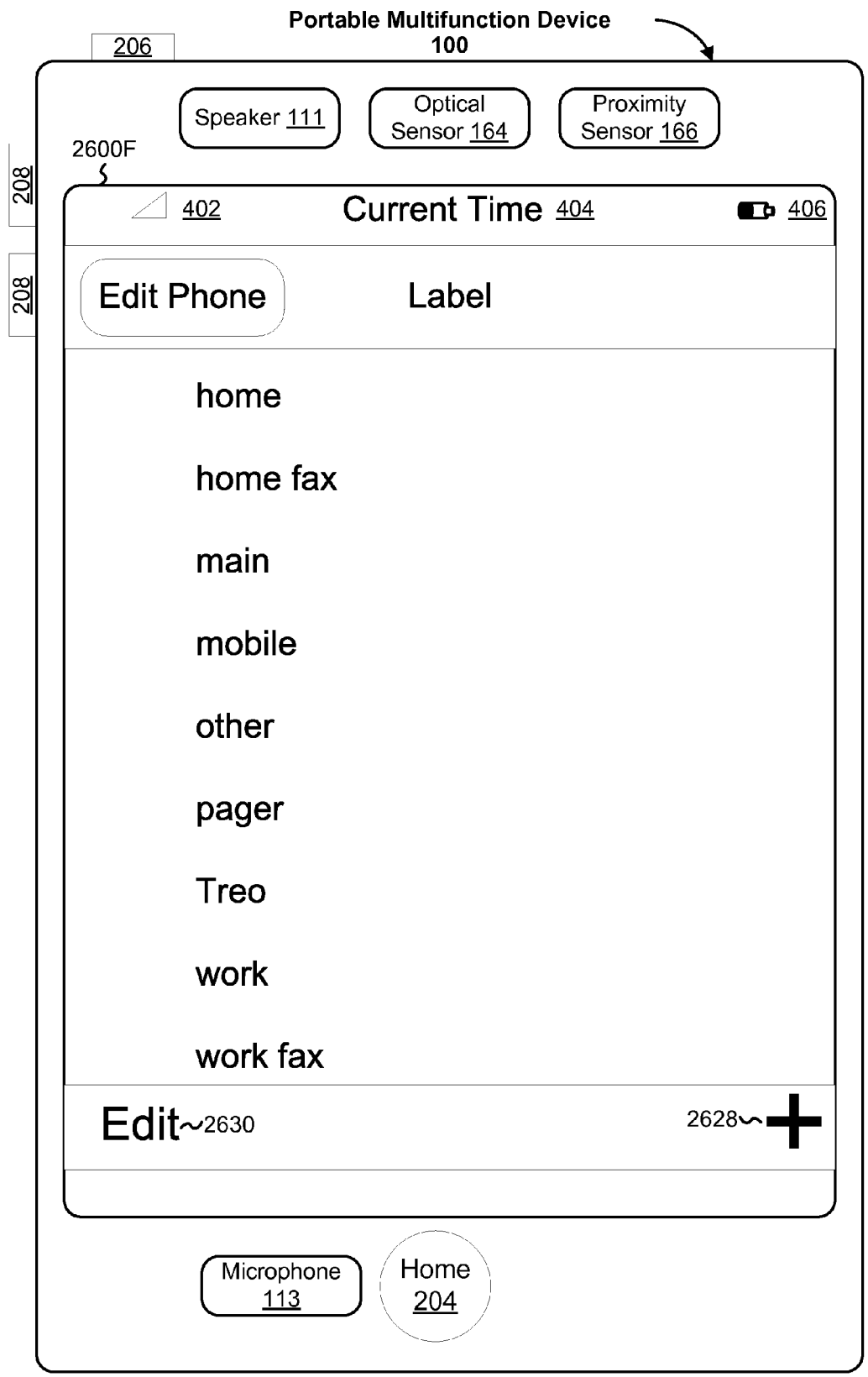
Figure 7G:
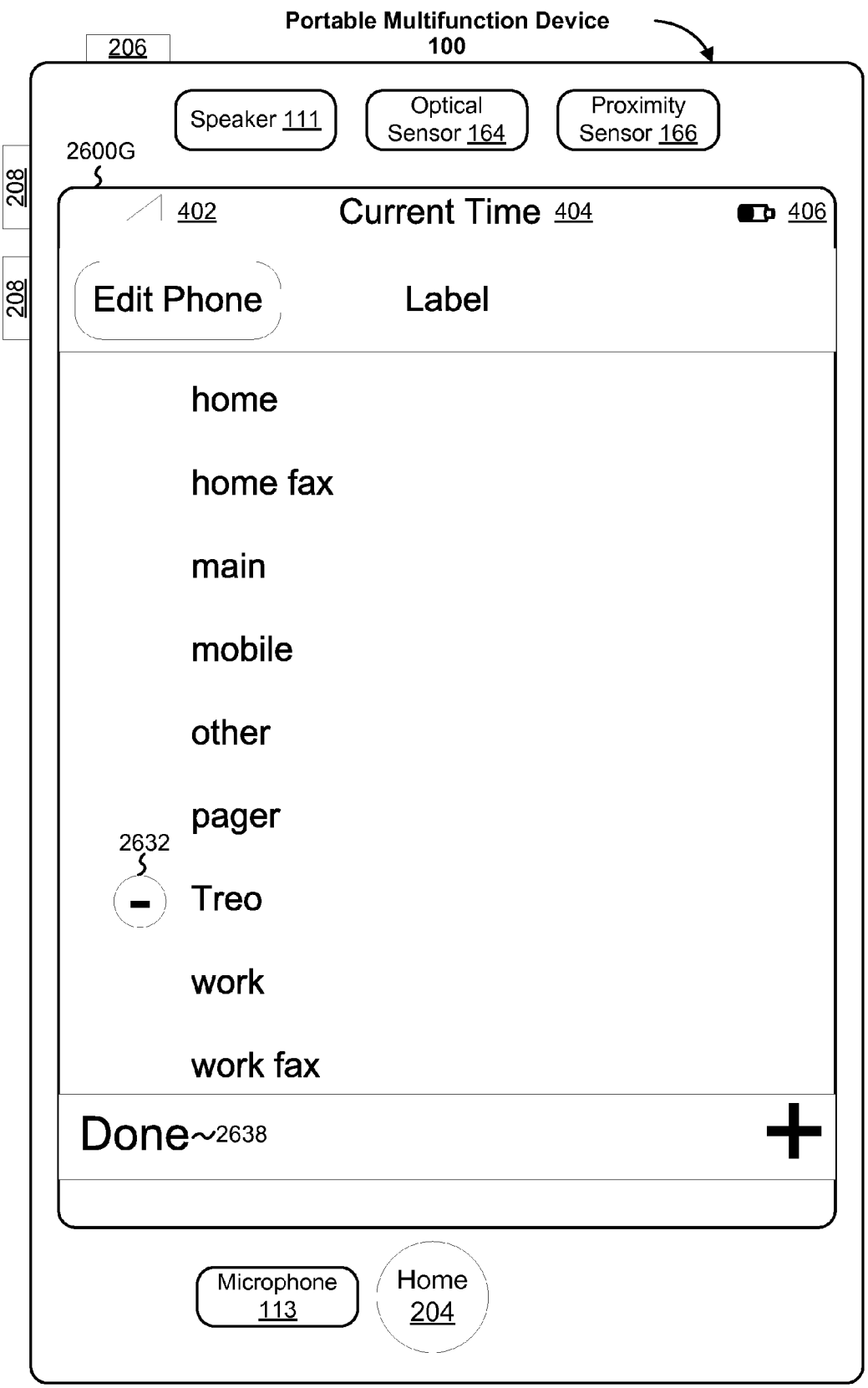
Figure 7H:
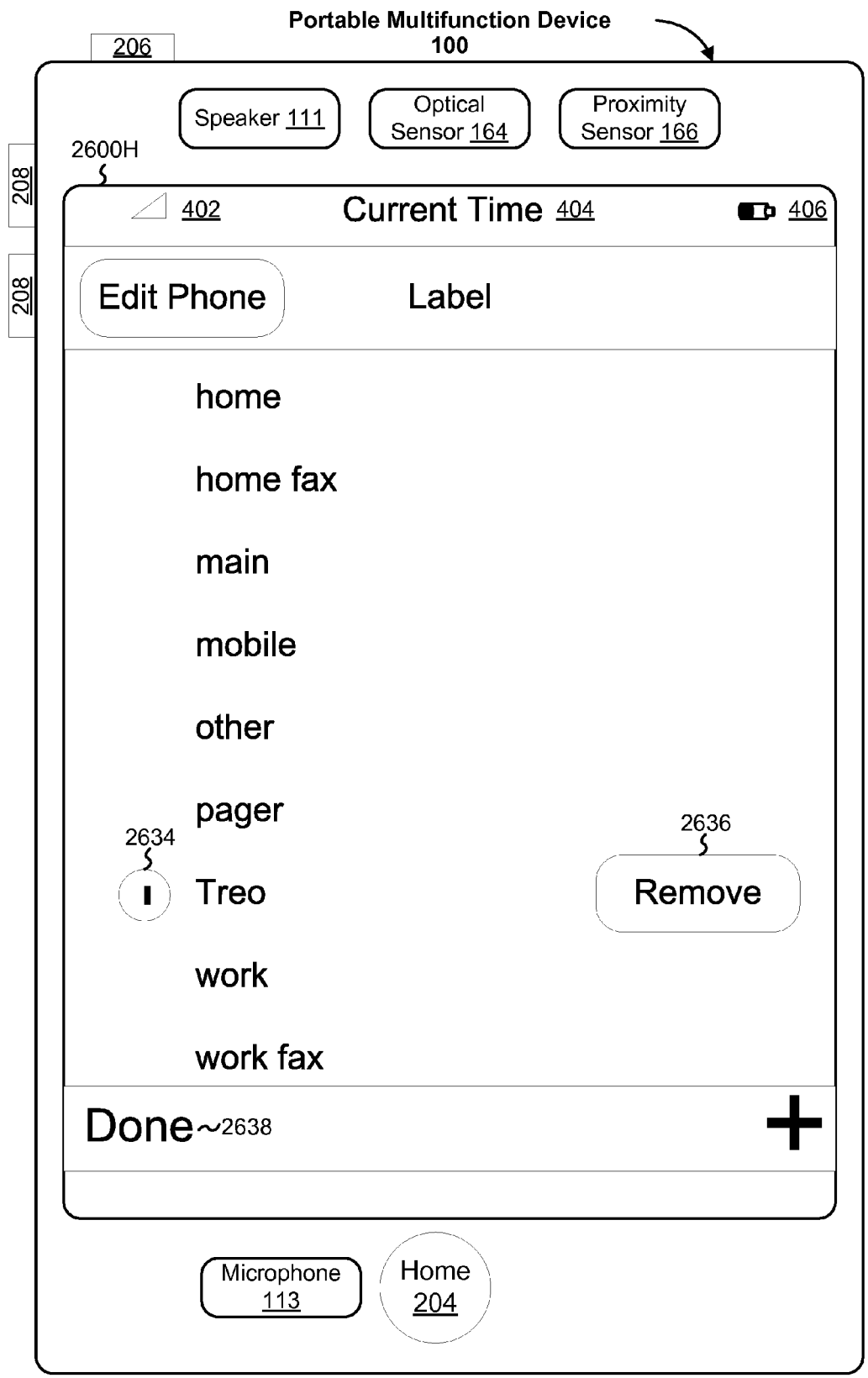
Figure 7I:
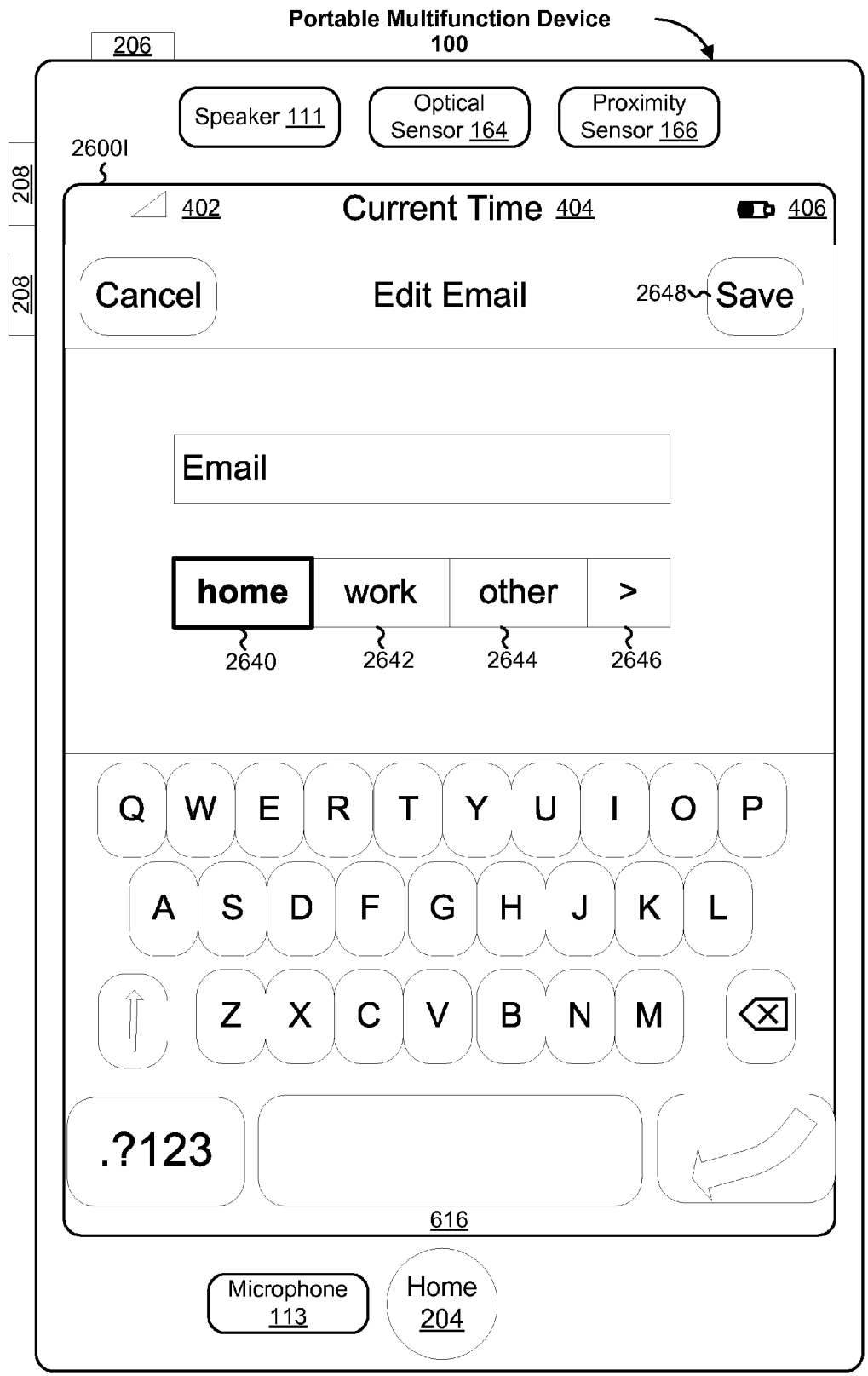

In some embodiments, in response to the user activating add new email icon 2610 (e.g., by a finger tap on the icon or on the row containing the icon), the touch screen displays a user interface for editing the email address(es) of the contact (e.g., UI 2600I, FIG. 7I).

In some embodiments, in response to the user entering the email address (e.g., via keyboard 616 in UI 2600I, FIG. 7I); specifying the type of email address (e.g., by a tap or other predefined gesture on home icon 2640, work icon 2642, or other icon 2644); and activating the save icon 2648 (e.g., by a finger tap on the icon), the contacts module creates an email address for the corresponding contact.

In some embodiments, the user can select additional email address types by activating selection icon 2646; add custom email address types, and/or delete email address types using processes and UIs analogous to those described for phone number types (FIGS. 7F-7H).

Figure 7J:
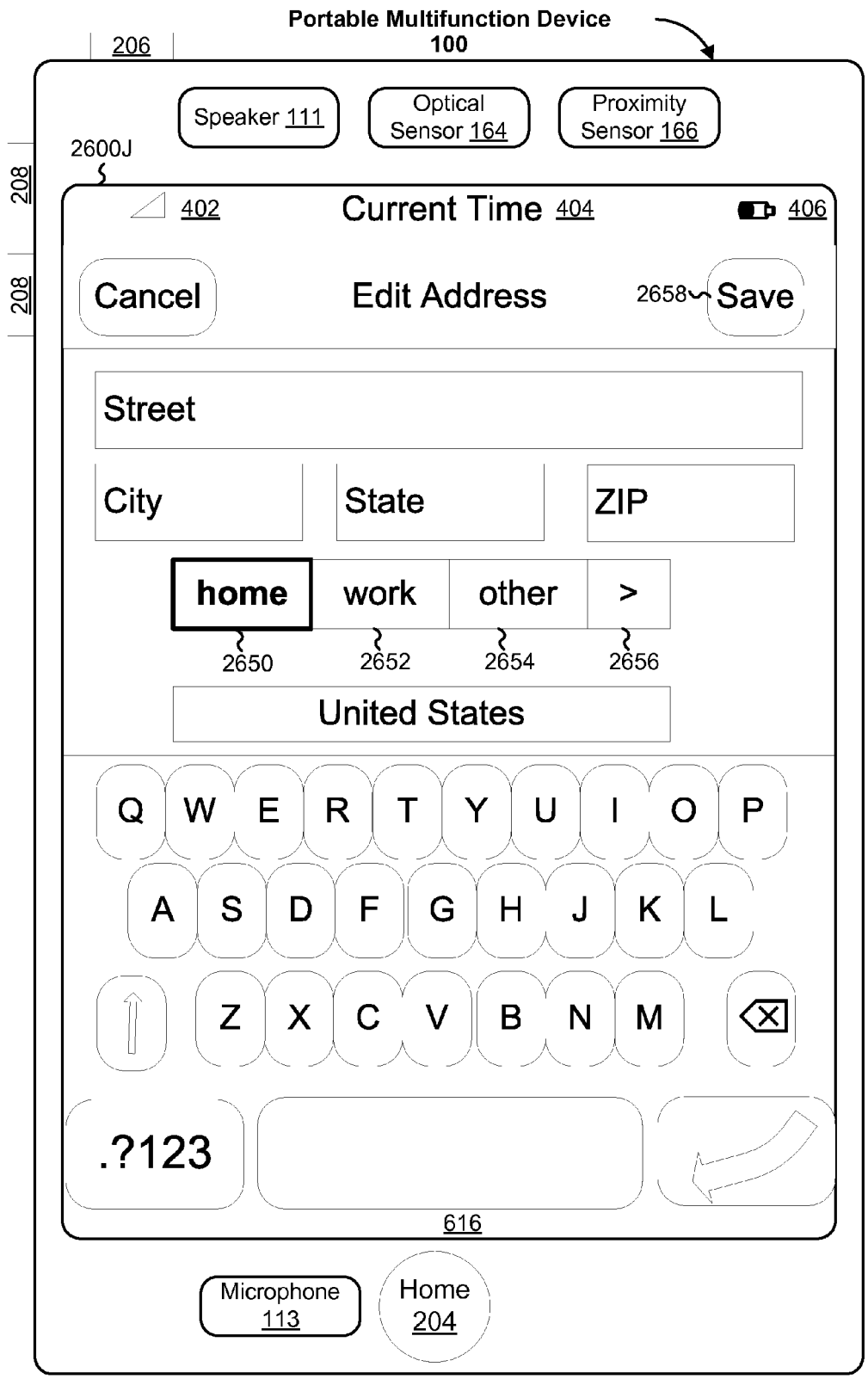

In some embodiments, in response to the user activating add new address icon 2612 (e.g., by a finger tap on the icon or on the row containing the icon), the touch screen displays a user interface for editing the physical address(es) of the contact (e.g., UI 2600J, FIG. 7J).

In some embodiments, in response to the user entering the address (e.g., via keyboard 616 in UI 2600J, FIG. 7J); specifying the type of address (e.g., by a tap or other predefined gesture on home icon 2650, work icon 2652, or other icon 2654); and activating the save icon 2658 (e.g., by a finger tap on the icon), the contacts module creates an address for the corresponding contact.

In some embodiments, the user can select additional address types by activating selection icon 2656; add custom address types, and/or delete address types using processes and UIs analogous to those described for phone number types (FIGS. 7F-7H).

Figure 7K:
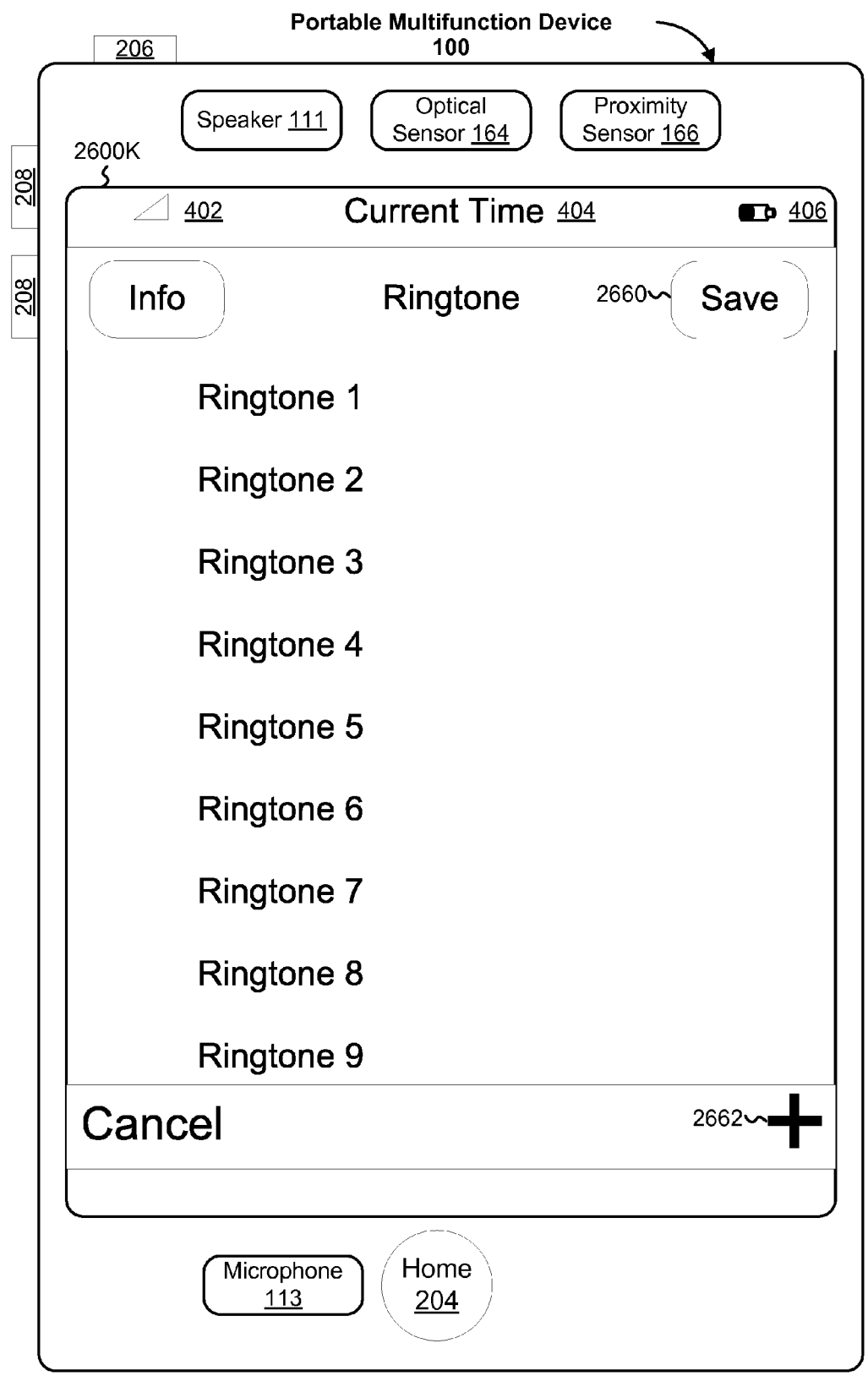

In some embodiments, in response to the user activating add new ringtone icon 2614 (e.g., by a finger tap on the icon or on the row containing the icon), the touch screen displays a user interface for selecting ringtones (e.g., UI 2600K, FIG. 7K).

In some embodiments, in response to the user selecting a ringtone (e.g., by tap or other predefined gesture on the ringtone or the row containing the ringtone) and activating the save icon 2660 (e.g., by a finger tap on the icon), the contacts module assigns a ringtone to the corresponding contact.

In some embodiments, the user can add new ringtones by activating add icon 2662. In some embodiments, the user can delete ringtones using processes and UIs analogous to those described for phone number types (FIGS. 7F-7H).

In some embodiments, a thumbnail image or other graphic 2616 (FIG. 7D) can be added for the contact.

Figure 7L:
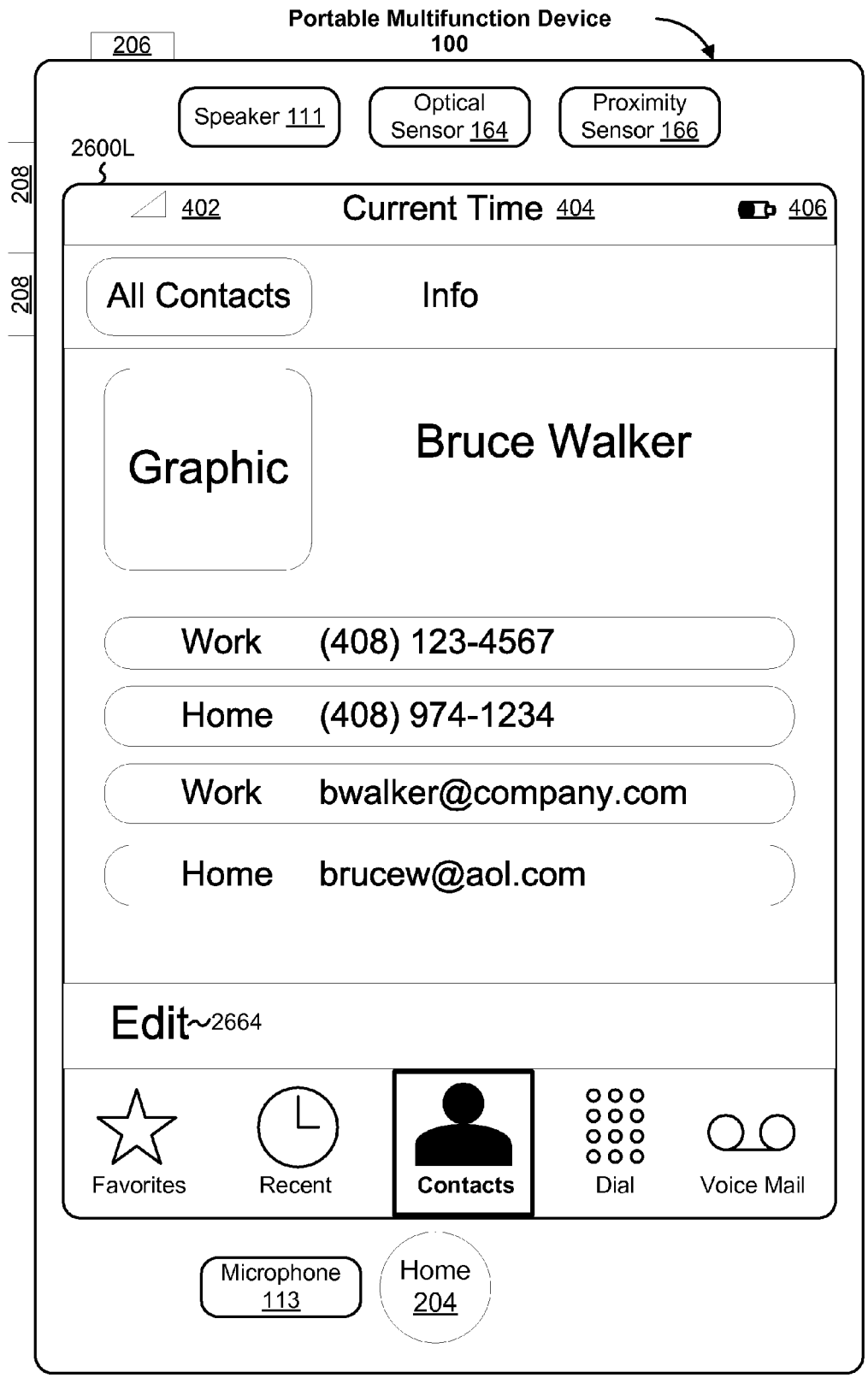
Figure 7M:
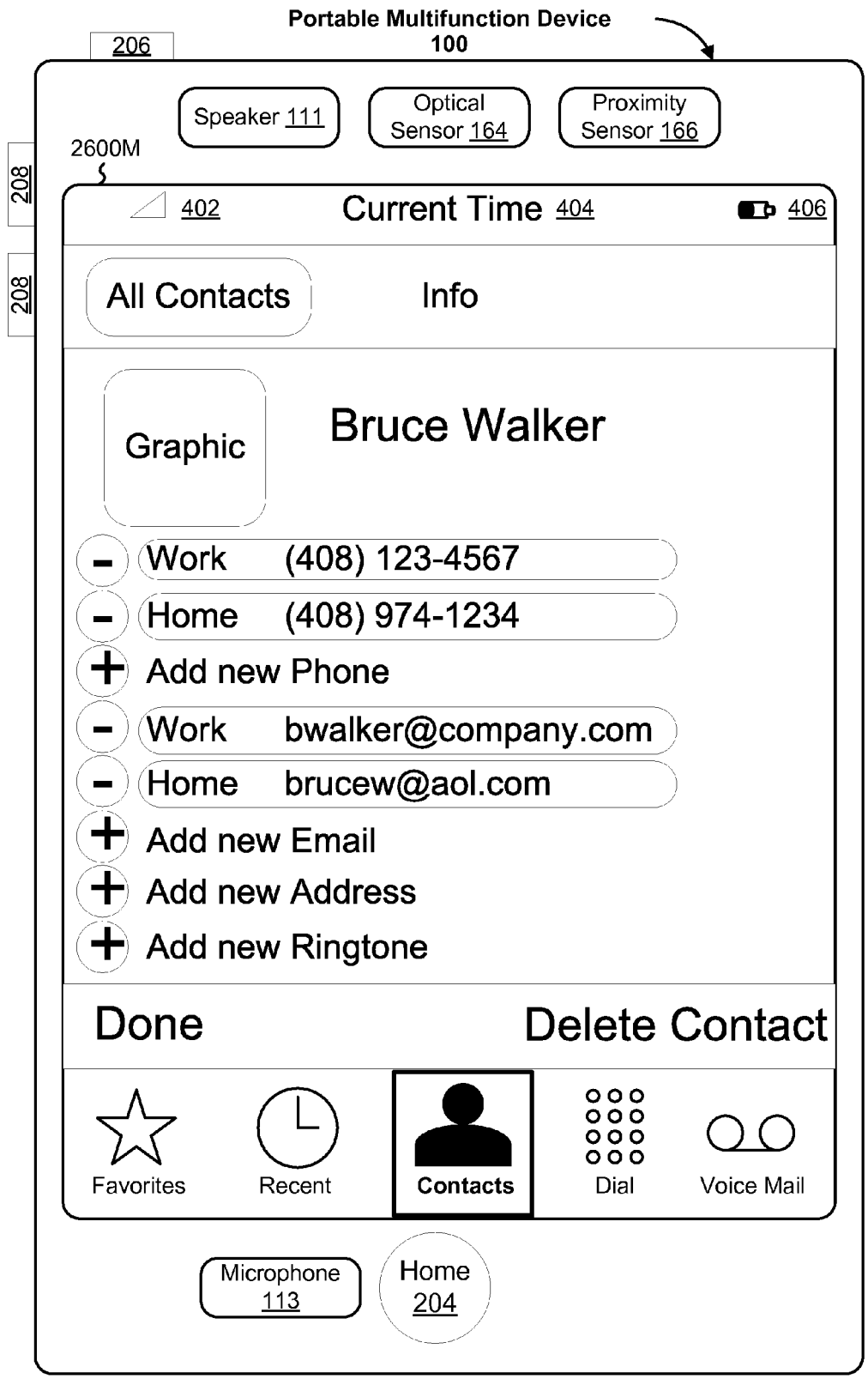

FIG. 7L illustrates an exemplary user interface for an existing contact list entry in accordance with some embodiments. In response to the user selecting edit icon 2664 (e.g., by a finger tap on the icon), the touch screen displays a user interface for editing the contact (e.g., UI 2600M, FIG. 7M). In response to user selections, the contact list module may delete one or more items of existing contact information, add new phone numbers, add new email addresses, add new physical addresses, and/or add new ringtones using the processes and UIs described above (e.g., FIGS. 7E-7K).

Figure 8A:
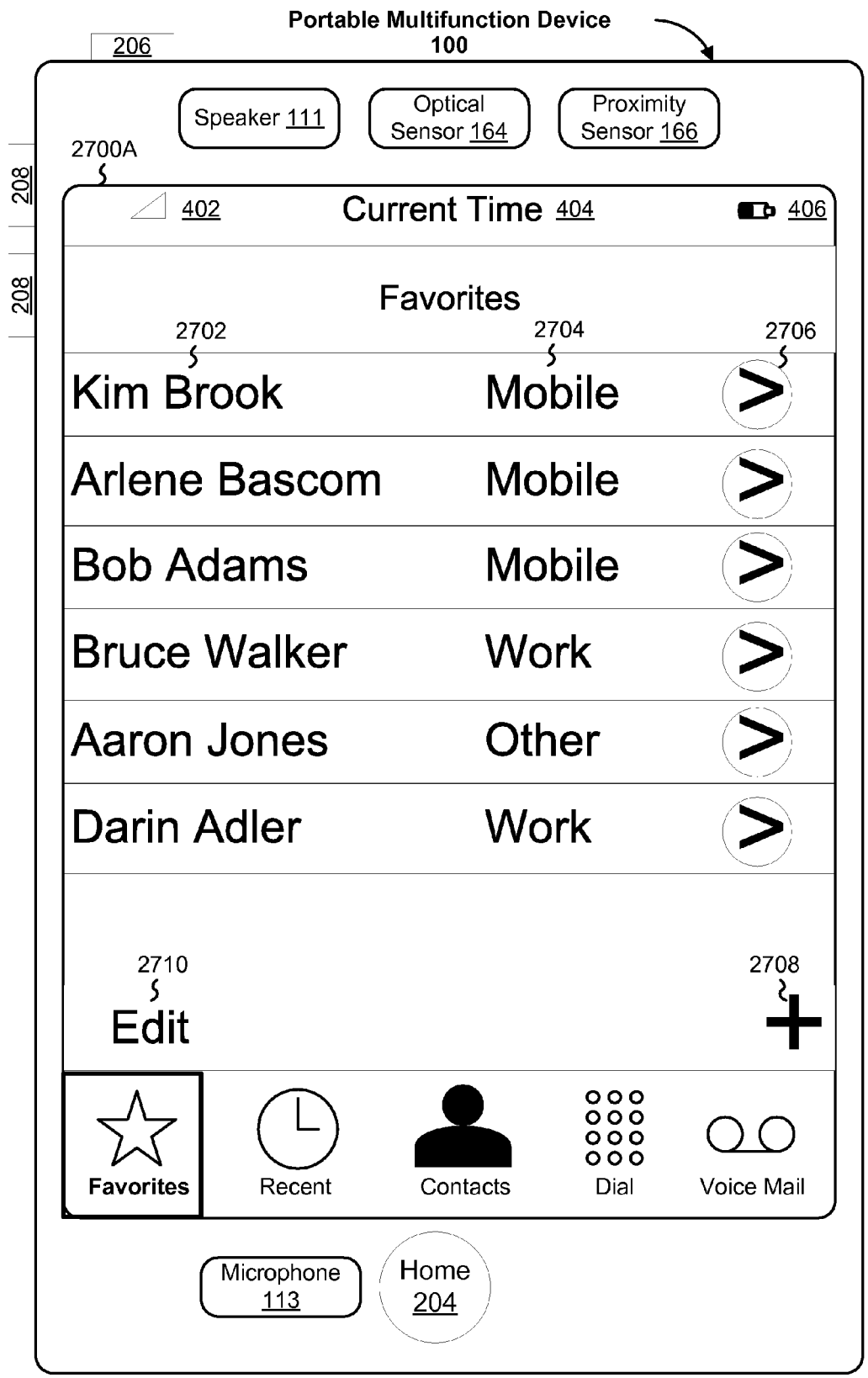
FIGS. 8A-8C illustrate an exemplary user interface for displaying and managing favorite contacts in accordance with some embodiments.
Figure 8B:
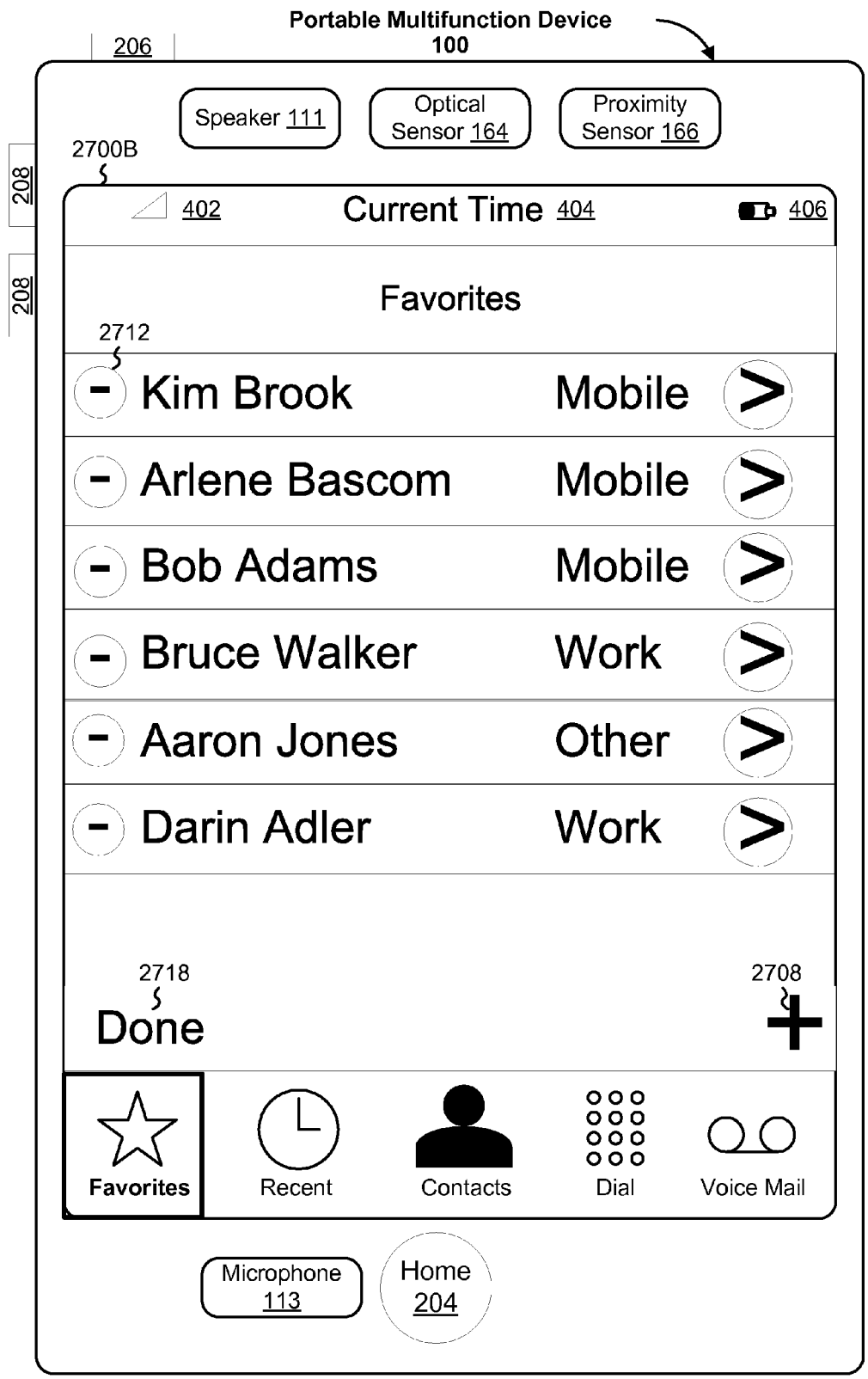
Figure 8C:
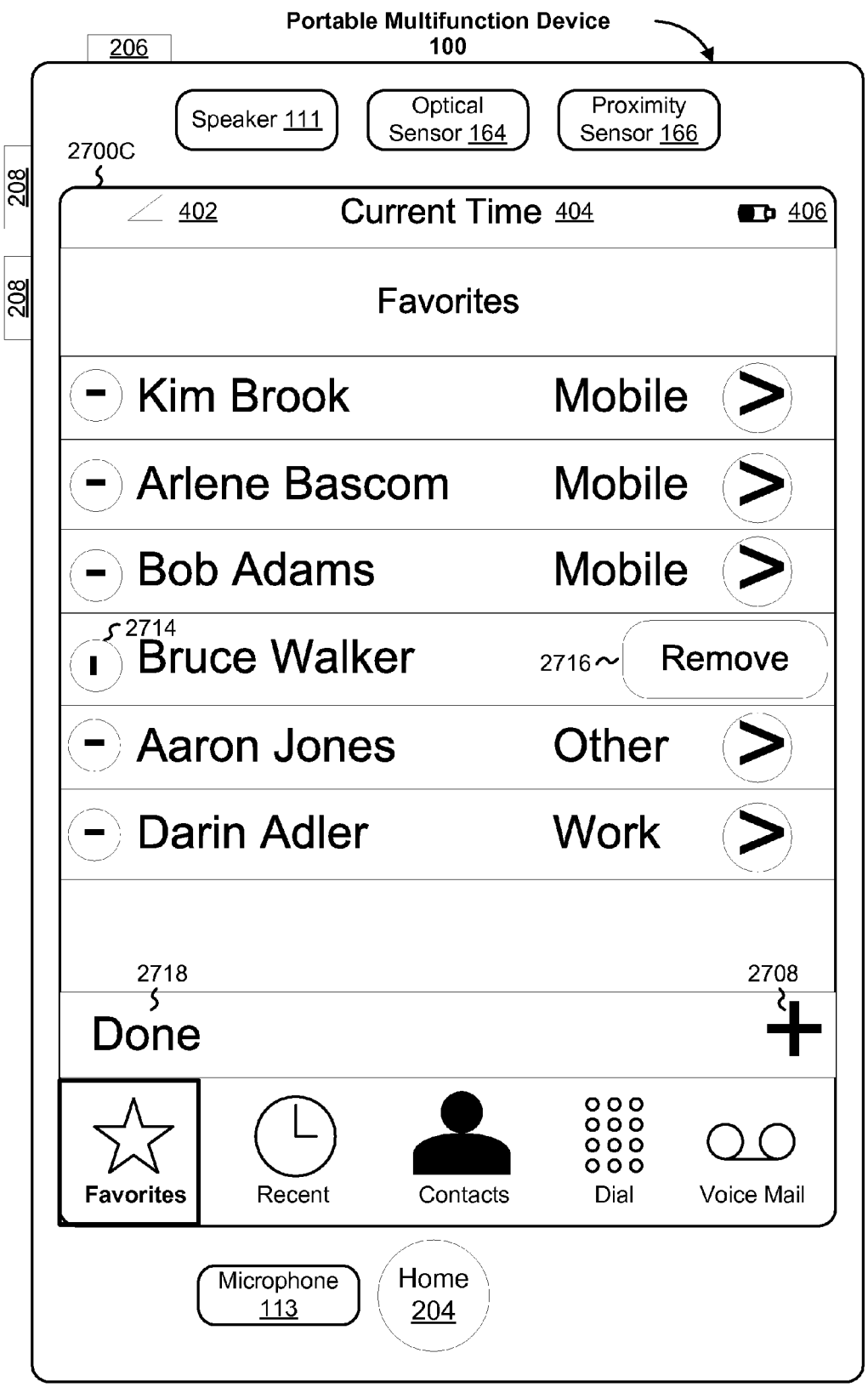

FIGS. 8A-8C illustrate an exemplary user interface for displaying and managing favorite contacts in accordance with some embodiments. UI 2700A displays an exemplary list of favorites. In some embodiments, each row in the list that corresponds to a favorite includes the name 2702 of the favorite, the type of phone number 2704 for the favorite that will be called, and an additional information icon 2706. In some embodiments, in response to the user activating icon 2706 for a particular favorite (e.g., by a finger tap on the icon), the touch screen displays the corresponding contact list entry for that favorite (e.g., UI 2600L, FIG. 7L). In some embodiments, in response to a user tap or other predefined gesture elsewhere (i.e., a tap or gesture other than on icon 2702) in the row corresponding to a particular favorite, the phone module dials the corresponding phone number 2704 for that particular favorite.

In some embodiments, in response to the user activating add favorite icon 2708 (e.g., by a finger tap on the icon), the device displays the user's contact list, from which the user selects the contact list entry for a new favorite and a phone number in the entry for the new favorite.

In response to the user activating the edit icon 2710 (e.g., by a finger tap on the icon), the touch screen displays a delete icon 2712 next to the favorites (e.g., UI 2700B, FIG. 8B). If a user activates a delete icon (e.g., by tapping it with a finger), the icon may rotate 90 degrees (e.g., 2714, FIG. 8C) or otherwise change its appearance and/or a second icon may appear (e.g., remove icon 2716, FIG. 8C). If the user activates the second icon, the corresponding favorite is deleted. If, however, the user deactivates the activated delete icon (e.g., 2714) (e.g., by tapping it a second time with a finger), the delete icon may rotate back 90 degrees or otherwise restore its original appearance and the second icon is deleted (e.g., remove icon 2716 is no longer displayed). This deletion process is analogous to the process described above with respect to FIGS. 6, 7G and 7H and described below with respect to FIGS. 9A and 9B. As noted above, a deletion process that requires multiple gestures by the user on different parts of the touch screen (e.g., delete icon 2714 and remove icon 2716 are on opposite sides of the touch screen in UI 2700C) greatly reduces the chance that a user will accidentally delete a favorite or other similar item. The user activates the done icon 2718 (e.g., by tapping on it with a finger) when the user has finished deleting favorites and the device returns to UI 2700A.

Figure 9A:
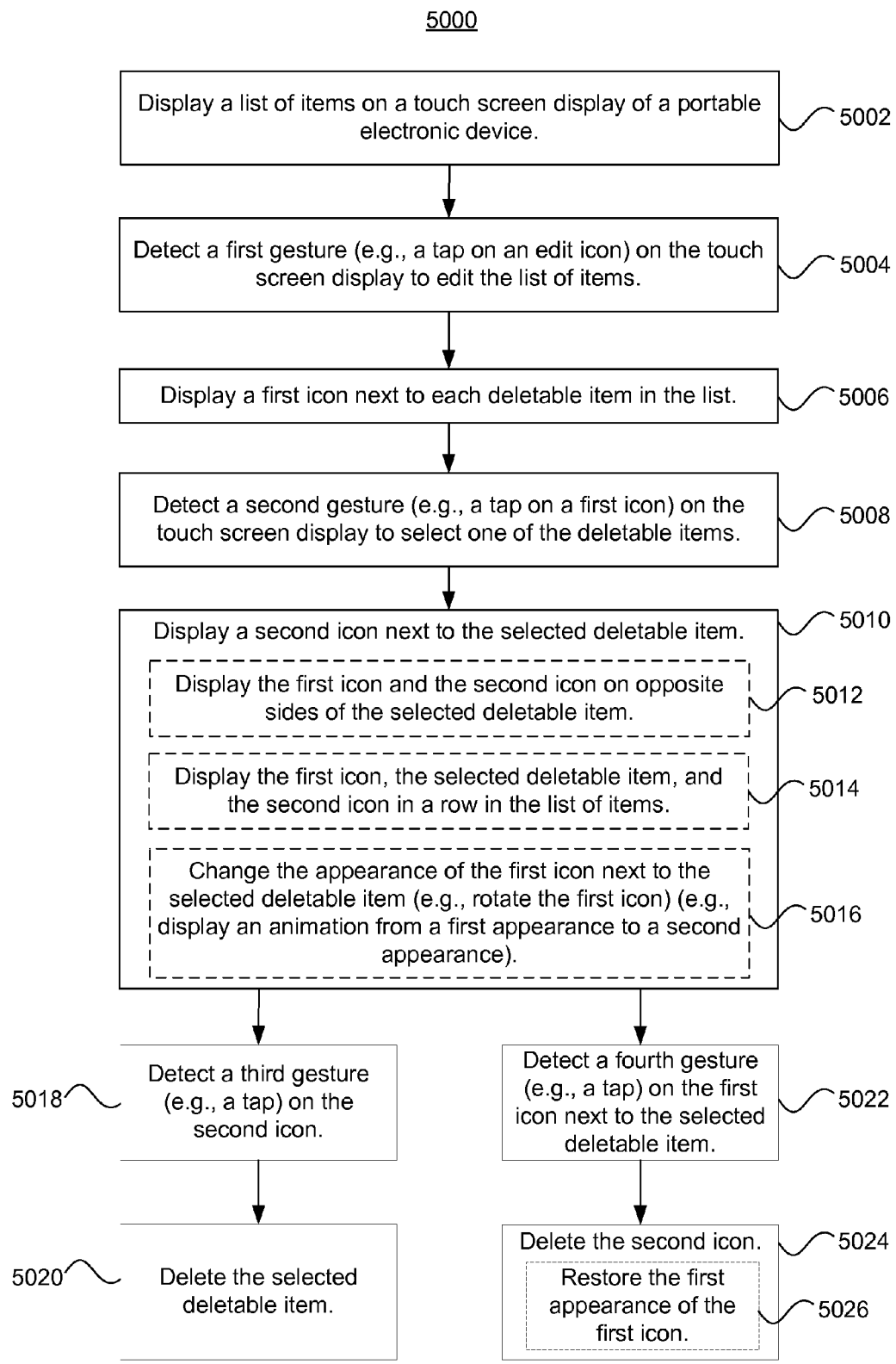
FIGS. 9A and 9B are flow diagrams illustrating a process for deleting items listed on a touch screen display of a portable electronic device in accordance with some embodiments.

FIG. 9A is a flow diagram illustrating a process 5000 for deleting items listed on a touch screen display of a portable electronic device in accordance with some embodiments. While the deletion process 5000 described below includes a number of operations that appear to occur in a specific order, it should be apparent that the process 5000 can include more or fewer operations, which can be executed serially or in parallel (e.g., using parallel processors or a multi-threading environment), an order of two or more operations may be changed and/or two or more operations may be combined into a single operation.

In process 5000, a list of items is displayed on the touch screen display of the portable electronic device (5002). In some embodiments, the list of items is a list of instant message conversations (e.g., UI 500, FIG. 5), a list of favorite phone numbers (e.g., UI 2700A, FIG. 8A), a list of contact information, a list of labels (e.g., UI 2600F, FIG. 7F), a list of email addresses, a list of physical addresses, a list of ringtones, or a list of bookmarks. A first gesture on the touch screen display to edit the list of items is detected (5004). In some embodiments, the first gesture comprises a tap on an edit icon. Examples of edit icons include icon 512 (FIG. 5), icon 2630 (FIG. 7F), and icon 2710 (FIG. 8A). In response to the first gesture, a first icon is displayed next to each deletable item in the list (5006). Examples of first icons include icons 702 (FIG. 6), 2632 (FIG. 7G), and 2712 (FIG. 8B). Displaying icons 702 next to each instant message listed in FIG. 6 indicates that each instant message is deletable, while displaying icon 2632 next to only the Treo phone label in FIG. 7G indicates that only the Treo label is deletable.

A second gesture on the touch screen display to select one of the deletable items is detected (5008). In some embodiments, the second gesture comprises a tap on the first icon next to the selected item. In response to the second gesture, a second icon is displayed next to the selected deletable item (5010). Examples of second icons include remove icons 704 (FIG. 6), 2636 (FIG. 7H), and 2716 (FIG. 8C).

In some embodiments, the first icon next to the selected deletable item and the second icon next to the selected deletable item are on opposite sides of the selected deletable item (5012). In some embodiments, the first icon next to the selected deletable item, the selected deletable item, and the second icon next to the selected deletable item are displayed in a row in the list of items (5014). In some embodiments, the first icon next to the selected deletable item and the second icon next to the selected deletable item are displayed on opposite sides of the row. In some embodiments, wherein the touch screen display has first and second opposite sides, the first icon next to the selected deletable item is displayed on the first side of the touch screen display and the second icon next to the selected deletable item is displayed on the second side of the touch screen display.

In some embodiments, the appearance of the first icon next to the selected deletable item is changed in response to the second gesture (5016). For example, the first icon next to the selected deletable item is rotated, as illustrated in FIG. 6: gesturing on icon 702-4 to select the instant message conversation with Bob Adams results in icon 702-4's rotated appearance as compared to the other icons 702. In some embodiments, the change in appearance comprises an animation from a first appearance to a second appearance.

If a third gesture on the second icon is detected (5018), the selected deletable item is deleted (5020). In some embodiments the third gesture comprises a tap on the second icon. If, however, a fourth gesture on the first icon next to the selected deletable item is detected (5022), the second icon is deleted (5024). In some embodiments in which the appearance of the first icon next to the selected deletable item is changed in response to the second gesture (5016), the appearance of this first icon is restored to its first appearance in response to the fourth gesture (5026). In some of these embodiments, the restoration of its first appearance comprises an animation from the second appearance to the first appearance. For example, if the icon was rotated in response to the second gesture, the icon is rotated back to its first appearance in response to the fourth gesture.

In some embodiments, detecting the first gesture, the second gesture, the third gesture, and the fourth gesture include detecting respective finger contacts with the touch screen display.

Process 5000 involves multiple gestures by the user on different parts of the touch screen to delete an item: the first gesture (e.g., on an edit icon), the second gesture on one of the first icons, and the third gesture on the second icon (e.g., a remove icon). These multiple gestures greatly reduce the chance that a user will accidentally delete a listed item. Furthermore, if the user decides not to delete an item after making the second gesture on the corresponding first icon, the user may make the fourth gesture on the corresponding first icon to delete the second icon (e.g., to delete the remove icon).

Figure 9B:
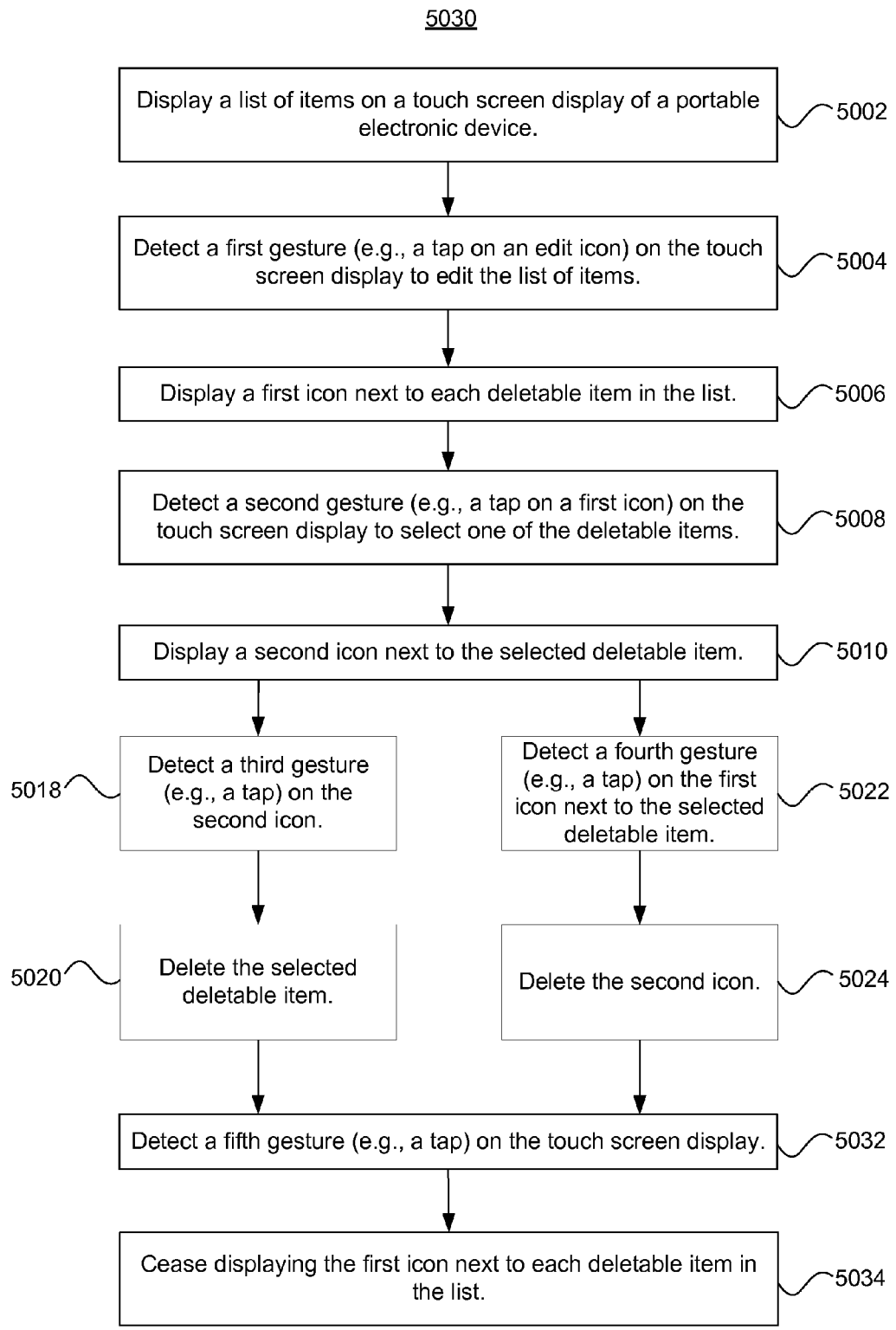

FIG. 9B is a flow diagram illustrating a process 5030 for deleting items listed on a touch screen display of a portable electronic device in accordance with some embodiments. While the deletion process 5030 described below includes a number of operations that appear to occur in a specific order, it should be apparent that the process 5030 can include more or fewer operations, which can be executed serially or in parallel (e.g., using parallel processors or a multi-threading environment), an order of two or more operations may be changed and/or two or more operations may be combined into a single operation.

Steps 5002-5024 are performed as described above with regards to process 5000 (FIG. 9A). A fifth gesture on the touch screen display is detected (5032). In some embodiments, the fifth gesture comprises a tap on a done icon, such as done icons 706 (FIG. 6), 2638 (FIGS. 7G and 7H), or 2718 (FIGS. 8B and 8C). In some embodiments, detected the fifth gesture includes detecting a respective finger contact with the touch screen display. In response to the fifth gesture, display of the first icon next to each deletable item in the list is ceased (5034).

Process 5030, like process 5000, involves multiple gestures that greatly reduce the chance that a user will accidentally delete a listed item. In addition, the fifth gesture (e.g., on a done icon) allows the user to end the deletion process: once display of the first icon next to each deletable item is ceased, items can only be deleted by performing the deletion process again from the beginning.

Figure 10:
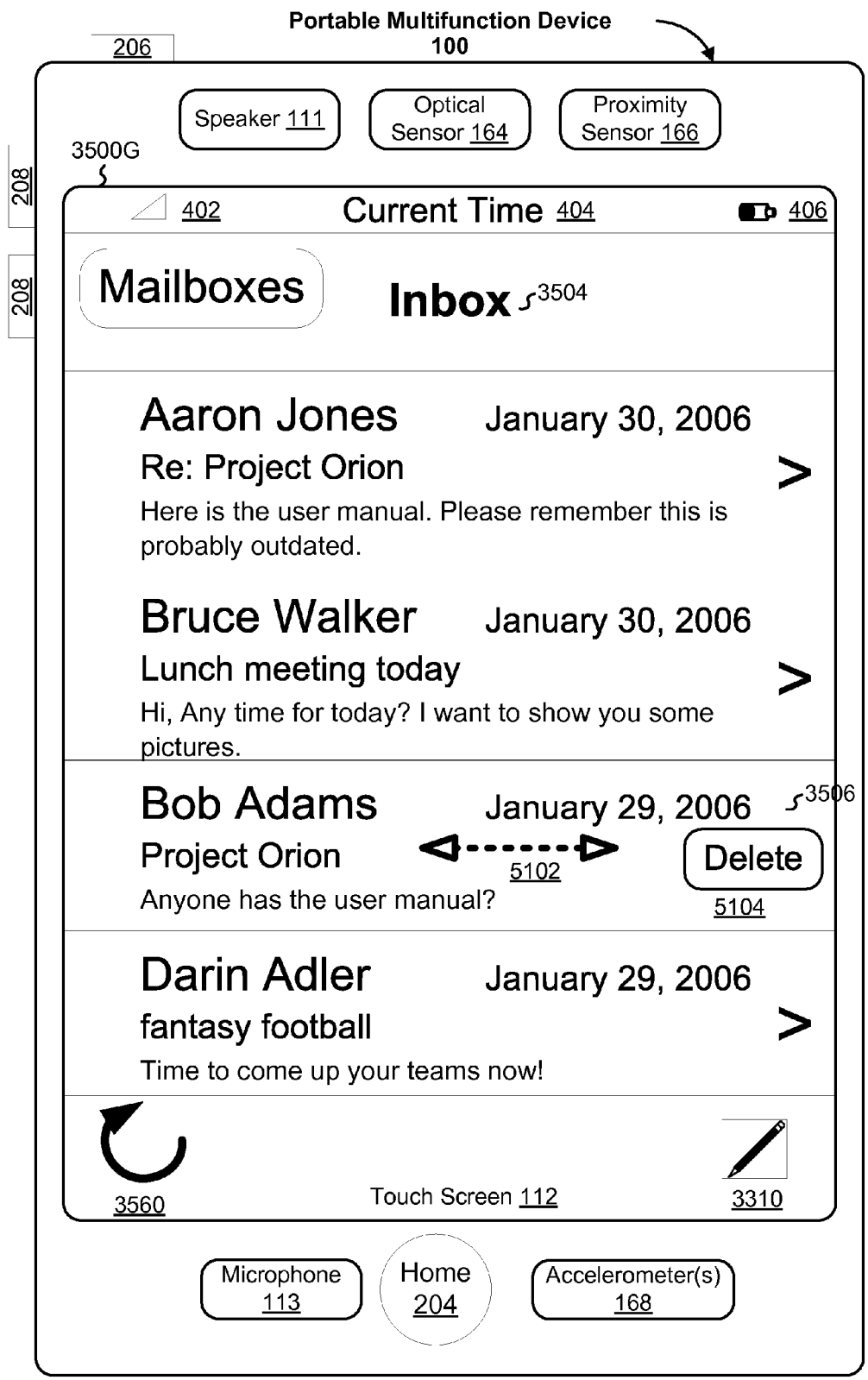
FIG. 10 illustrates an exemplary user interface for deleting an email in accordance with some embodiments.

FIG. 10 illustrates an exemplary user interface 3500G of a portable multifunction device 100 for deleting an email in accordance with some embodiments. In some embodiments, the user interface 3500G displays contents of an email inbox 3504 by listing for each displayed email: the identity of the sender, a timestamp, a subject and a brief snippet from the email. The user interface 3500G can be employed with a portable multifunction device that, in some embodiments, includes a speaker 111, optical sensor 164, proximity sensor 166, touch screen 112, microphone 113, and accelerometer(s) 168, as described above, or a subset or superset of these features. Features of the user interface 3500G also include sensitivity to a deletion selection gesture 5102 and a deletion confirmation icon 5104.

The user interface 3500G is responsive to user contact with the touch screen 112, including gestures, such as touches, taps and swipes made with a finger, stylus, or other input device. The user interface 3500G is configured to detect a particular gesture by which a user selects for deletion a particular item from a list of items. In one embodiment, one possible selection gesture is a swipe (e.g., with a finger) over the individual item to be selected for deletion. Different embodiments can impose a range of conditions on the orientation and length of a swipe, and optionally the number of back-and-forth swipe phases or strokes, required to select a particular item for deletion. For example, in some embodiments a selection swipe can be in any direction or orientation with respect to the item to be selected—as long as the swipe travels over the item. In other embodiments, a selection swipe can only be along a row in which the item to be selected is displayed. Further, in some embodiments a swipe gesture used for selecting an item for deletion must include at least a predefined number of back-and-forth phases or strokes that travel over the item, without liftoff of the user's finger (or stylus) from the touch screen. Other gestures (individual or in combination) can also be employed to select an individual item consistent with the capabilities of a multifunction device 100 to identify for selection a particular item in response to a particular gesture.

In FIG. 10, the user interface 3500G is illustrated as a user is in the process of deleting an email 3506 from "Bob Adams" related to "Project Orion." In this embodiment, the user interface 3500G enables a user to first select an item for deletion by performing a swipe 5102 with a finger or another input device (shown as a two-sided arrow) over the item to be deleted. If the user interface 3500G detects the use of an appropriate deletion selection gesture in conjunction with a particular item, it displays a deletion confirmation icon next to that item. For example, as shown in FIG. 10, in response to the swipe gesture 5102, the user interface 3500G displays a deletion confirmation icon 5104, shown here as a "Delete" button, next to the email 3506. In some embodiments, the deletion icon is displayed in the same row as the item to be deleted (a shown in FIG. 10). In other embodiments, the deletion icon can also be displayed beside the item to be deleted, or in any other manner that identifies the item that was selected for deletion. By displaying a deletion confirmation icon such that a user can identify the item selected for deletion, the user interface 3500G enables the user to confirm that they used the appropriate selection gesture in conjunction with the item they intended to delete. Alternately, the swipe gesture for deleting an item may be a multi-phase or back-and-forth swipe, wherein the user must perform a predefined number (e.g., 2, 3 or 4) of back-and-forth swipe phases or strokes to specify an item for deletion. In some embodiments, a multi-phase swipe must be performed without liftoff of the user's finger (or stylus) during performance of the gesture.

In response to an appropriate user gesture in conjunction with the deletion icon, the user interface 3500G will trigger deletion of the corresponding item. The appropriate user gesture can be defined differently in different embodiments. For example, in some embodiments, a user can confirm deletion of the selected item by tapping on/near the deletion confirmation icon 5104 with a finger, stylus or other input device. In other embodiments, the user can confirm a pending deletion by making a pre-defined gesture on the touch-screen 112 (not necessarily in proximity to the deletion icon.). For example, in the situation shown in FIG. 10, the user can confirm deletion of the email 3506 by tapping on the "Delete" button with a finger. In another embodiment, they might make a pre-defined finger gesture outside the display area for the item 3506.

In some embodiments, if the user fails to make the appropriate gesture to confirm the deletion of the selected item, the user interface 3500G deletes/removes the deletion icon 5104 from the touch screen display. This prevents the user from deleting an item that might have been inadvertently selected for deletion, or an item that the user selected but then decided not to delete. In some embodiments, the user interface 3500G can interpret a range of actions or user inaction as a failure to confirm the deletion, including: a touch on the touch screen 112 anywhere that is not in proximity to the deletion icon 5104, or a failure to touch the screen at all within a preset timeout period.

In some embodiments, the user interface 3500G allows users to select for deletion only those individual items that are deletable. The user interface 3500G can employ display attributes of the touch screen to indicate those items that are or are not deletable.

The features described with reference to FIG. 10 pertain, for purposes of illustration, to a representative type of item (i.e., email) that can be individually selected by a user for deletion using one embodiment 3500G of a user interface. More generally, the present invention can be implemented in any type of portable multifunction device 100 that displays lists or other collections of items on a touch screen display. For example, features of the user interface 3500G described herein can be used to manage the deletion of any type of document or user item, including, without limitation, instant messages, contacts, labels, ringtones, favorites, emails, voice mails, media files, images/photos, album art, shortcuts, or settings. Illustrative user interfaces for managing some of these document types, which are compatible with the gesture delete features described with reference to FIG. 10, are illustrated in other Figures described above.

Figure 11:
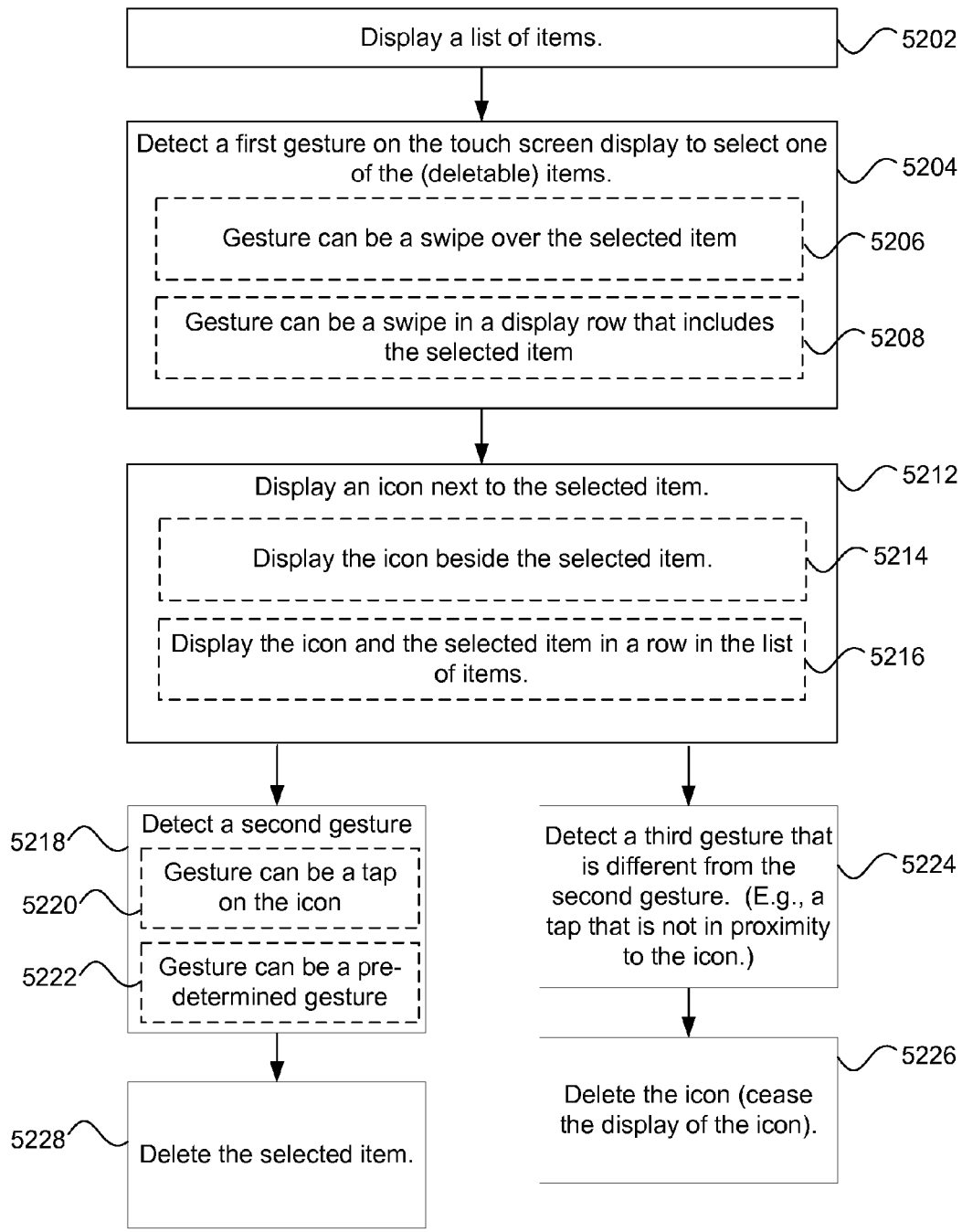
FIG. 11 is a flow diagram illustrating a process for deleting an item listed on a touch screen display of a portable electronic device in accordance with some embodiments.

FIG. 11 is a flow diagram illustrating a process 5200 for deleting an item listed on a touch screen display of a portable electronic device in accordance with some embodiments. While the deletion process 5200 described below includes a number of operations that appear to occur in a specific order, it should be apparent that the process 5200 can include more or fewer operations, which can be executed serially or in parallel (e.g., using parallel processors or a multi-threading environment), an order of two or more operations may be changed and/or two or more operations may be combined into a single operation.

In the process 5200, a list of items is displayed on the touch screen display of the portable electronic device (5202). In some embodiments, the list of items is a list of instant message conversations (e.g., UI 500, FIG. 5), a list of favorite phone numbers (e.g., UI 2700A, FIG. 8A), a list of contact information, a list of labels (e.g., UI 2600F, FIG. 7F), a list of email addresses, a list of physical addresses, a list of ringtones, or a list of bookmarks. A first gesture on the touch screen display to select one of the deletable items is detected (5204). In some embodiments, the first gesture is a finger swipe over the item to be selected (5206). The first gesture can also be a swipe in a display row that includes the selected item (5208). Different types of first gestures are described with reference to FIG. 10.

In response to the first gesture, an icon (e.g., a deletion confirmation icon 5104 as described with reference to FIG. 10) is displayed next to the selected item (5212). In some embodiments, this icon can be displayed beside the selected item (5214). In other embodiments, as shown in FIG. 10, the icon can be displayed in the row in the list of items that includes the item selected for deletion (5216).

If a second gesture is detected (5218) the selected item is deleted (5228). In some embodiments the second gesture comprises a tap on the icon (5220). In other embodiments, the gesture can be a predetermined gesture on the touch screen 112, which gesture may or may not be in proximity to the icon (5222).

If, however, a third gesture is detected (5224) that is different from the expected second gesture, the icon is deleted (display of the icon is ceased) (5226). For example, in an embodiment where the second gesture is a tap on a deletion confirmation icon (5104), the third gesture might be any touch that is not in proximity to that icon, or a touch that is on a neighboring, unselected item from the list of items. In some embodiments, detecting the first gesture, the second gesture, the third gesture, and the fourth gesture include detecting respective finger contacts with the touch screen display 112.

The process 5200 involves multiple gestures by the user on different parts of the touch screen to delete an item: the first gesture (e.g., to select an item), and the second gesture on an icon associated with an item to be deleted. These multiple gestures greatly reduce the chance that a user will accidentally delete a listed item. Furthermore, if the user decides not to delete an item after selecting an item, the user may make the third gesture to delete the second icon (e.g., to remove from the user interface the "Delete" button).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising: at a portable electronic device with a touch screen display,
- displaying a list of items;
- detecting a first gesture on the touch screen display to edit the list of items;
- responding to the first gesture by displaying a first icon next to each deletable item in the list;
- detecting a second gesture on the touch screen display to select one of the deletable items;
- responding to the second gesture by displaying a second icon next to the selected deletable item;
- deleting the selected deletable item if a third gesture on the second icon is detected;
- deleting the second icon if a fourth gesture on the first icon next to the selected deletable item is detected; and
- ceasing to display the first icon next to each deletable item in the list if a fifth gesture on the touch screen display is detected.

2. A method, comprising: at a portable electronic device with a touch screen display,
- displaying a list of items;
- detecting a first gesture on the touch screen display to edit the list of items;
- responding to the first gesture by displaying a first icon next to each deletable item in the list;
- detecting a second gesture on the touch screen display to select one of the deletable items;
- responding to the second gesture by displaying a second icon next to the selected deletable item;
- deleting the selected deletable item if a third gesture on the second icon is detected; and
- deleting the second icon if a fourth gesture on the first icon next to the selected deletable item is detected.

3. The method of claim 2, wherein the list of items is a list of instant message conversations, a list of favorite phone numbers, a list of contact information, a list of labels, a list of email addresses, a list of physical addresses, a list of ringtones, or a list of bookmarks.

4. The method of claim 2, wherein the first gesture comprises a tap gesture on an edit icon.

5. The method of claim 2, wherein the second gesture comprises a tap on the first icon next to the selected deletable item.

6. The method of claim 2, including changing the appearance of the first icon next to the selected deletable item in response to the second gesture.

7. The method of claim 6, wherein the change in appearance includes an animation from a first appearance to a second appearance.

8. The method of claim 6, wherein the change in appearance comprises a rotation of the first icon next to the selected deletable item.

9. The method of claim 2, wherein the first icon next to the selected deletable item and the second icon next to the selected deletable item are on opposite sides of the selected deletable item.

10. The method of claim 2, wherein the first icon next to the selected deletable item, the selected deletable item, and the second icon next to the selected deletable item are displayed in a row in the list of items.

11. The method of claim 10, wherein the first icon next to the selected deletable item and the second icon next to the selected deletable item are displayed on opposite sides of the row.

12. The method of claim 10, wherein the touch screen display has first and second opposite sides, and the first icon next to the selected deletable item is displayed on the first side of the touch screen display and the second icon next to the selected deletable item is displayed on the second side of the touch screen display.

13. The method of claim 2, wherein the third gesture comprises a tap gesture on the second icon.

14. The method of claim 2, wherein detecting the first gesture, the second gesture, the third gesture, and the fourth gesture includes detecting respective finger contacts with the touch screen display.

15. The method of claim 2, wherein the fourth gesture comprises a tap gesture on the first icon next to the selected deletable item.

16. The method of claim 2, including ceasing to display the first icon next to each deletable item in the list if a fifth gesture on the touch screen display is detected.

17. The method of claim 16, wherein the fifth gesture comprises a tap gesture on a done icon.

18. A graphical user interface on a portable electronic device with a touch screen display, comprising:
- a list of items;
- one or more first icons next to deletable items in the list; and
- a second icon next to a selected deletable item in the list, the second icon being different from the first icon;
- wherein:
  - the one or more first icons are displayed in response to the detection of a first gesture on the touch screen display to edit the list of items;
  - the second icon is displayed next to the selected deletable item in the list in response to the detection of a second gesture on the touch screen display to select one of the deletable items;
  - the selected deletable item is deleted if a third gesture on the second icon is detected; and
  - the second icon is deleted if a fourth gesture on the first icon next to the selected deletable item is detected.

19. A portable electronic device, comprising:
- a touch screen display;
- one or more processors;
- memory; and
- one or more programs, wherein the one or more programs are stored in the memory and configured to be executed by the one or more processors, the programs including:
  - instructions for displaying a list of items;
  - instructions for detecting a first gesture on the touch screen display to edit the list of items;
  - instructions for responding to the first gesture by displaying a first icon next to each deletable item in the list;
  - instructions for detecting a second gesture on the touch screen display to select one of the deletable items;
  - instructions for responding to the second gesture by displaying a second icon next to the selected deletable item;
  - instructions for deleting the selected deletable item if a third gesture on the second icon is detected; and
  - instructions for deleting the second icon if a fourth gesture on the first icon next to the selected deletable item is detected.

20. The portable electronic device of claim 19, wherein the second gesture comprises a tap on the first icon next to the selected deletable item.

21. The portable electronic device of claim 19, including changing the appearance of the first icon next to the selected deletable item in response to the second gesture.

22. The portable electronic device of claim 21, wherein the change in appearance comprises a rotation of the first icon next to the selected deletable item.

23. The portable electronic device of claim 19, wherein the first icon next to the selected deletable item and the second icon next to the selected deletable item are on opposite sides of the selected deletable item.

24. The portable electronic device of claim 19, wherein the first icon next to the selected deletable item, the selected deletable item, and the second icon next to the selected deletable item are displayed in a row in the list of items.

25. The portable electronic device of claim 24, wherein the first icon next to the selected deletable item and the second icon next to the selected item are displayed on opposite sides of the row.

26. The portable electronic device of claim 24, wherein the touch screen display has first and second opposite sides, and the first icon next to the selected deletable item is displayed on the first side of the touch screen display and the second icon next to the selected deletable item is displayed on the second side of the touch screen display.

27. A non-transitory computer readable storage medium storing one or more programs, the one or more programs comprising instructions, which when executed by a portable electronic device with a touch screen display, cause the device to:
 display a list of items;
 detect a first gesture on the touch screen display to edit the list of items;
 respond to the first gesture by displaying a first icon next to each deletable item in the list;
 detect a second gesture on the touch screen display to select one of the deletable items;
 respond to the second gesture by displaying a second icon next to the selected deletable item;
 delete the selected deletable item if a third gesture on the second icon is detected; and
 delete the second icon if a fourth gesture on the first icon next to the selected deletable item is detected.

28. The non-transitory computer readable storage medium of claim 27, wherein the second gesture comprises a tap on the first icon next to the selected deletable item.

29. The non-transitory computer readable storage medium of claim 27, further including instructions, which when executed by the portable electronic device, cause the device to change the appearance of the first icon next to the selected deletable item in response to the second gesture.

30. The non-transitory computer readable storage medium of claim 29, wherein the change in appearance comprises a rotation of the first icon next to the selected deletable item.

31. The non-transitory computer readable storage medium of claim 27, wherein the first icon next to the selected deletable item and the second icon next to the selected deletable item are on opposite sides of the selected deletable item.

32. The non-transitory computer readable storage medium of claim 27, wherein the first icon next to the selected deletable item, the selected deletable item, and the second icon next to the selected deletable item are displayed in a row in the list of items.

33. The non-transitory computer readable storage medium of claim 32, wherein the first icon next to the selected deletable item and the second icon next to the selected item are displayed on opposite sides of the row.

34. The non-transitory computer readable storage medium of claim 32, wherein the touch screen display has first and second opposite sides, and the first icon next to the selected deletable item is displayed on the first side of the touch screen display and the second icon next to the selected deletable item is displayed on the second side of the touch screen display.

35. A portable electronic device with a touch screen display, comprising:
 means for displaying a list of items;
 means for detecting a first gesture on the touch screen display to edit the list of items;
 means for responding to the first gesture by displaying a first icon next to each deletable item in the list;
 means for detecting a second gesture on the touch screen display to select one of the deletable items;
 means for responding to the second gesture by displaying a second icon next to the selected deletable item;
 means for deleting the selected deletable item if a third gesture on the second icon is detected; and
 means for deleting the second icon if a fourth gesture on the first icon next to the selected deletable item is detected.

36. A method, comprising: at a portable electronic device with a touch screen display:
 displaying a list of items;
 detecting a first gesture on the touch screen display to select for deletion an item in the list of items;
 in response to detecting the first gesture, displaying a delete icon next to the selected item;
 deleting the selected item if a second gesture on the delete icon is detected; and
 deleting the delete icon if a third gesture is detected on the touch screen display at a location that is not on the delete icon.

37. The method of claim 36, wherein the first gesture is a swipe over the selected item.

38. The method of claim 37, wherein the swipe is performed in a display row that includes the selected item.

39. The method of claim 36, wherein at least one of the first and second gestures is a finger gesture.

40. The method of claim 36, further comprising,
 deleting the delete icon if a third gesture is detected anywhere on the touch screen display except in proximity to the delete icon.

41. The method of claim 36, wherein the second gesture is a pre-defined user interaction on the delete icon.

42. The method of claim 41, wherein the pre-defined user interaction is a tap on the delete icon.

43. The method of claim 41, wherein the pre-defined user interaction is a finger gesture.

44. The method of claim 36, wherein the items in the list of items have document types selected from at least one of: instant message, contact, label, ringtone, favorite, email, voice mail, media file, image, album art or shortcut.

45. A portable electronic device, comprising:
 a touch screen display;
 one or more processors;
 memory; and
 one or more programs, wherein the one or more programs are stored in the memory and configured to be executed by the one or more processors, the programs including instructions for:
 displaying a list of items;
 detecting a first gesture on the touch screen display to select for deletion an item in the list of items;
 in response to detecting the first gesture, displaying a delete icon next to the selected item;
 deleting the selected item if a second gesture on the delete icon is detected; and
 deleting the delete icon if a third gesture is detected on the touch screen display at a location that is not on the delete icon.

46. A non-transitory computer readable storage medium storing one or more programs, the one or more programs comprising instructions, which when executed by a portable electronic device with a touch screen display, cause the device to:
- display a list of items;
- detect a first gesture on the touch screen display to select for deletion an item in the list of items;
- respond to the first gesture by displaying a delete icon next to the selected item;
- delete the selected item if a second gesture on the delete icon is detected; and
- deleting the delete icon if a third gesture is detected on the touch screen display at a location that is not on the delete icon.

47. A method, comprising: at a portable electronic device with a touch screen display:
- displaying a list of items;
- detecting a first gesture on the touch screen display to select for deletion an item in the list of items;
- in response to detecting the first gesture, displaying a delete icon within the selected item;
- deleting the selected item if a second gesture on the delete icon is detected; and
- deleting the delete icon if a third gesture is detected on the touch screen display at a location that is not on the delete icon.

48. A portable electronic device, comprising:
- a touch screen display;
- one or more processors;
- memory; and
- one or more programs, wherein the one or more programs are stored in the memory and configured to be executed by the one or more processors, the programs including:
  - instructions for displaying a list of items;
  - instructions for detecting a first gesture on the touch screen display to select for deletion an item in the list of items;
  - instructions for, in response to detecting the first gesture, displaying a delete icon within the selected item; and
  - deleting the delete icon if a third gesture is detected on the touch screen display at a location that is not on the delete icon.

49. A non-transitory computer readable storage medium storing one or more programs, the one or more programs comprising instructions, which when executed by a portable electronic device with a touch screen display, cause the device to:
- display a list of items;
- detect a first gesture on the touch screen display to select for deletion an item in the list of items;
- respond to the first gesture by displaying a delete icon within the selected item; and
- deleting the delete icon if a third gesture is detected on the touch screen display at a location that is not on the delete icon.

* * * * *